(12) United States Patent
Parekh et al.

(10) Patent No.: US 8,811,912 B2
(45) Date of Patent: Aug. 19, 2014

(54) REMOTE CONTROL OF MOBILE DEVICES TO PERFORM TESTING OF WIRELESS COMMUNICATIONS NETWORKS

(75) Inventors: Biren Parekh, Cumming, GA (US); Mark Austin, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 165 days.

(21) Appl. No.: 13/441,302

(22) Filed: Apr. 6, 2012

(65) Prior Publication Data

US 2013/0267179 A1 Oct. 10, 2013

(51) Int. Cl.
*H04B 17/00* (2006.01)

(52) U.S. Cl.
USPC ............ 455/67.11; 455/67.13; 455/67.14; 455/115.1; 340/10.51

(58) Field of Classification Search
USPC .......... 455/67.11, 67.13, 67.14, 115.1, 115.2, 455/423, 41.2; 340/10.51; 235/375
See application file for complete search history.

(56) References Cited

U.S. PATENT DOCUMENTS

| | | | |
|---|---|---|---|
| 7,231,182 B2 | 6/2007 | Katz | |
| 7,443,805 B1 * | 10/2008 | Bynum | 370/254 |
| 7,890,299 B2 | 2/2011 | Fok et al. | |
| 8,204,498 B1 * | 6/2012 | Smith et al. | 455/425 |
| 2007/0072599 A1 * | 3/2007 | Romine et al. | 455/423 |
| 2009/0054056 A1 | 2/2009 | Gil | |
| 2010/0041391 A1 | 2/2010 | Spivey et al. | |
| 2010/0094930 A1 | 4/2010 | Griff et al. | |
| 2011/0039571 A1 | 2/2011 | Bodine et al. | |

OTHER PUBLICATIONS

AT&T, "AT&T Wireless Network at a Glance," Fact Sheet, http://www.att.com/Common/merger/files/pdf/wirelessnetwork/network-glance.pdf Copyright 2008 AT&T Intellectual Property.
AT&T, "AT&T Wireless Network at a Glance," Fact Sheet, http://www.att.com/Common/merger/files/pdf/ wirelessnetwork/network-glance.pdf.
Ascom, "TEMS Pocket — A Complete Measurement Smartphone System in Your Hand," http://www.ascom.us/us-en/tems-pocket-11.2-feature-datasheet.pdf.

* cited by examiner

*Primary Examiner* — Minh D Dao
(74) *Attorney, Agent, or Firm* — Hartman & Citrin LLC

(57) ABSTRACT

A remote testing and control system sends instructions to perform a test to a mobile device, receives test results from the mobile device in response to the instructions, presents the test results within a user interface so that that the test results are viewable by a user, and receives an input to control the test results. The test results may be received and presented within the user interface in real-time. The instructions to perform the test may be scheduled to be sent at a specified time.

19 Claims, 29 Drawing Sheets

| SCHEDULE TESTS | PENDING TESTS | LIVE TEST RESULTS | SCHEDULED RESULTS | ARCHIVED RESULTS | GLOBAL SEARCH |

PENDING TESTS

| TEST DEVICE NUMBER | NICK NAME | START DATE | START TIME | STOP DATE | STOP TIME |
|---|---|---|---|---|---|
| 678-555-1234 | ALPHARETTA 3 | 2012.04.17 | 09:15:00 | 2012.04.17 | 09:30:00 |
| 678-555-1234 | ALPHARETTA 2 | 2012.04.17 | 09:58:00 | 2012.04.19 | 09:58:00 |
| 678-555-1235 | WOODSTOCK | 2012.04.18 | 16:00:00 | 2012.04.18 | 20:00:00 |
| 678-555-1234 | ALPHARETTA 1 | 2012.04.25 | 01:00:00 | 2012.04.25 | 02:00:00 |
| 678-555-4321 | MILTON | 2012.04.26 | 06:00:00 | 2012.04.26 | 08:30:00 |

[EDIT] [DELETE] [CANCEL]

*FIG. 7*

REMOTE CONTROL OF MOBILE DEVICES TO PERFORM TESTING OF WIRELESS COMMUNICATIONS NETWORKS

TECHNICAL FIELD

The concepts and technologies disclosed herein generally relate to remote data collection. More particularly, the concepts and technologies disclosed herein relate to remote control of mobile devices to perform testing of wireless communications networks.

BACKGROUND

Wireless communications service providers traditionally utilize drive testing to test signal strength and coverage of their networks. The results of drive testing are typically used by a wireless communications service provider to prioritize investments in new cell sites and equipment to improve the network quality and coverage. Drive testing typically involves hundreds or even thousands of technicians and specially designed vehicles and testing equipment. This is incredibly costly to the wireless service provider, and so many wireless service providers are looking at alternatives to eliminate, or at least reduce, the need for drive testing and the expense associated therewith.

It is with respect to these and other considerations that the disclosure made herein is presented.

SUMMARY

Concepts and technologies are disclosed herein for remote control of mobile devices to perform testing of wireless communications networks. According to one aspect disclosed herein, a method for testing a wireless communications network remotely via a mobile device is executed by a remote testing and control ("RTC") system. The RTC system sends instructions to perform a test to the mobile device, receives test results of the test performed by the mobile device in response to the instructions to perform the test, presents the test results within a user interface, and receives an input to control the test results.

In some embodiments, the RTC system receives the test results from the mobile device and presents the test results within the user interface in real-time. Real-time is defined herein as the actual time during which a process or event occurs. In the aforementioned embodiments, the RTC receives and presents the test results in real-time, meaning the test results are available for presentation within milliseconds so that it is available virtually immediately as feedback. Real-time is also used herein interchangeably with live and instantaneous. The present inherent latencies of communications and computer processes may prevent real-time processes, such as the receipt and presentation of test results, from occurring within an infinitesimal amount of time. It should be understood, however, that real-time is also used herein to broadly encompass zero time and any time that approaches zero as a limit.

In some embodiments, the input to control the test results includes a request to stop the test. In these embodiments, in response to receiving the request to stop the test, the RTC system sends instructions to stop the test to the mobile device and no longer receives the test results until the test is resumed, if at all. As an alternative to resuming the test, the RTC system may receive request to initiate a new test. The new test, in some embodiments, includes one or more parameters that are different from the parameters included in the test. In any case, the RTC system sends instructions to perform the new test to the mobile device, receives new test results of the new test performed by the mobile device in response to the instructions to perform the test, and present the new test results within the user interface.

In some embodiments, a user of the RTC system may review the test results of the test and determine that it would be beneficial or, in some instances, necessary, to perform the new test in an effort to troubleshoot one or more aspects of the wireless communications network. The new test results may be received and presented within the user interface in real-time. In some embodiments, the results of the test and the new test are presented simultaneously so as to enable easy viewing by a user to facilitate troubleshooting one or more aspects of the wireless communications network.

In some embodiments, the input to control the test results includes a request to pause the test. In these embodiments, in response to receiving the request to pause the test, the RTC system sends instructions to pause the test to the mobile device and no longer receives the test results of the test while the test is paused. In these embodiments, the RTC system also receives a request to resume the test, sends instructions to resume the test to the mobile device, and then resumes receiving the test results of the test.

In some embodiments, the RTC system archives test results in a test results data store. The archived test results may be analyzed for use in making decisions regarding the deployment of additional network resources such as, but not limited to, cell sites and associated equipment.

In some embodiments, the instructions to perform the test include instructions to attach to the wireless communications network and to perform the test on the wireless communications network. The wireless communications network, in these embodiments, may include a mobile telecommunications network or a WI-FI network.

In some embodiments, the instructions to perform the test include instructions to attach to the wireless communications network to perform the test and to attach to a second wireless communications network to send the test results of the test to the RTC system via the second wireless communications network. The wireless communications network, in these embodiments, may include a mobile telecommunications network or a WI-FI network. The second wireless communications network, in these embodiments, may include a mobile telecommunications network or a WI-FI network. In some embodiments, the wireless communications network is a mobile telecommunications network and the second communications network is a WI-FI network. In other embodiments, the wireless communications network is a WI-FI network and the second communications network is a mobile telecommunications network.

It should be appreciated that the above-described subject matter may be implemented, for example, as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 7 is a user interface diagram illustrating an illustrative user interface for managing pending tests, according to embodiments presented herein.

DETAILED DESCRIPTION

Figure 1:
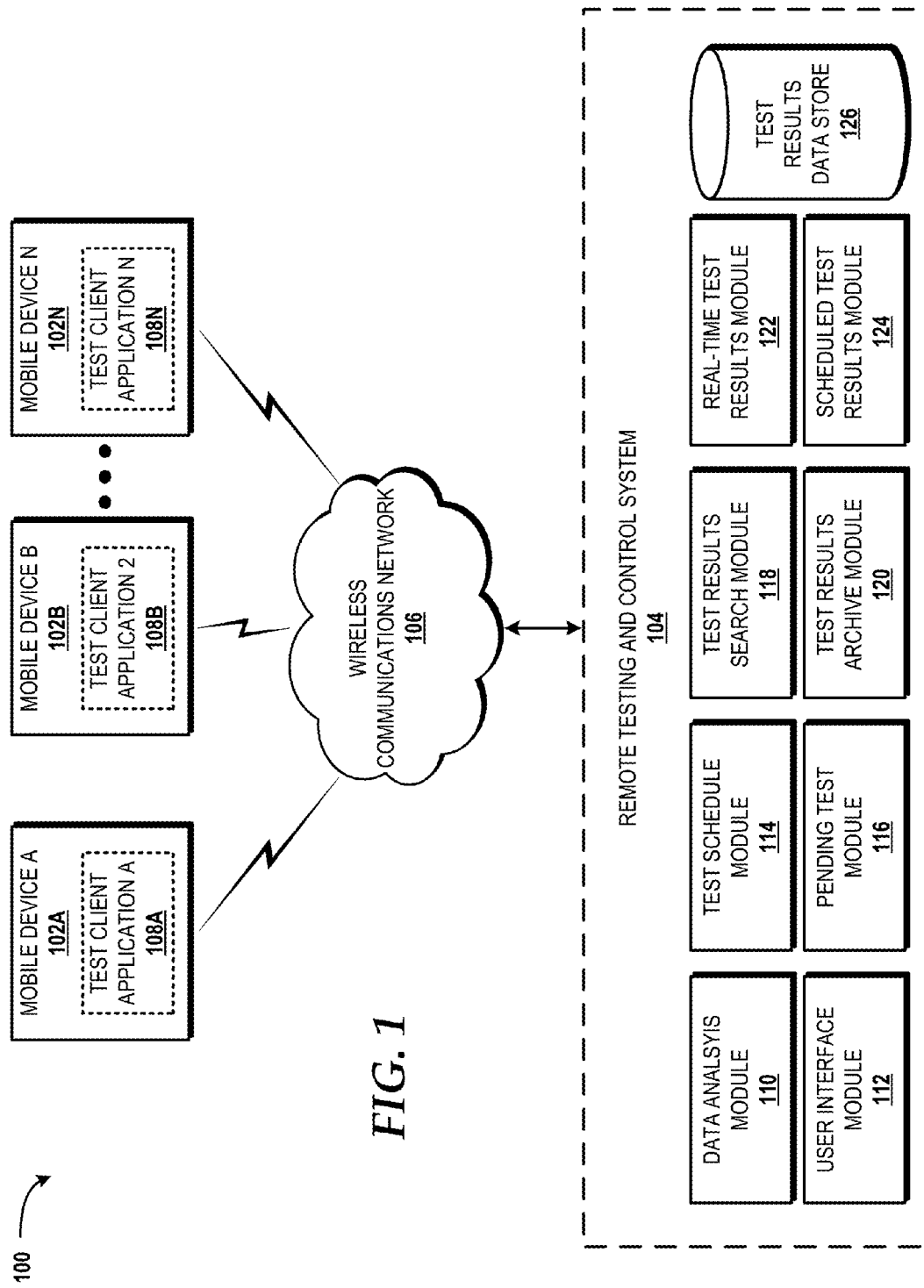
FIG. 1 is a diagram illustrating an illustrative operating environment for implementing various embodiments presented herein.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, mobile devices, wireless devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodologies, among others, for remote control of mobile devices to perform testing of wireless communications networks will be presented.

Referring now to FIG. 1, aspects of an operating environment 100 for various embodiments presented herein will be described. The illustrated operating environment 100 includes a mobile device A 102A, a mobile device B 102B, and a mobile device N 102N (hereinafter referred to collectively and/or generically as mobile device(s) 102). Each of the mobile devices 102 may be a mobile telephone such as a smartphone, or another computing device such as a laptop computer, a tablet computer, a notebook computer, an ultraportable computer, a personal digital assistant ("PDA"), or any other type of computing system configured to perform the various operations described herein. In particular, each of the mobile devices 102 is configured to communicate with a remote testing and control system ("RTC") system 104 via a wireless communications network 106.

In some embodiments, the wireless communications network 106 is or includes a wireless wide area network ("WWAN"), such as a mobile telecommunications network utilizing one or more mobile telecommunications technologies to provide data services and/or voice services to the mobile devices 102 and/or other devices (not shown). The mobile telecommunications technologies that may be utilized by the wireless communications network 106 to provide data services and/or voice services to the mobile devices 102 include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"), or a combination thereof. Moreover, the wireless communications network 106 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access technologies or standards. The wireless communications network 106 may be configured to provide voice and/or data communications with any combination of the above technologies. The wireless communications network 106 may be configured to or adapted to provide voice and/or data communications in accordance with future generation technologies.

In some embodiments, the wireless communications network 106 is or includes a wireless local area network ("WLAN") operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some embodiments, the WLAN is implemented utilizing one or more wireless WI-FI access points. In some embodiments, one or more of the wireless WI-FI access points is another computing device with connectivity to a WWAN and, as such, is functioning as a WI-FI hotspot. Connections to the WLAN may be secured via various encryption technologies including, but not limited, WI-FI Protected Access ("WPA"), WPA2, Wired Equivalent Privacy ("WEP"), and the like.

Although only a single network is illustrated, it is contemplated that one or more of the mobile devices 102 may be in communication with one or more other networks (not shown). The other network(s) may also be WWAN or WLAN networks, which facilitate a connection to the wireless communications network 106 or are provided as stand-alone networks.

In the illustrated embodiment, each of the mobile devices 102 includes a test client application 108. In particular, the mobile device A 102A includes a test client application A 108A, the mobile device B 102B includes a test client application B 108B, and the mobile device N 102N includes a test client application N 108N (hereinafter referred collectively and/or generically as test client application(s) 108).

The test client application 108 is configured to receive instructions from the RTC system 104 to perform one or more tests on a wireless communications network, such as the illustrated wireless communications network 106 and/or one or more other networks (not shown). In general, the test client application 108 can be configured to perform any type of test to acquire metrics regarding one or more operational aspects of the wireless communications network 106 or whatever network the test client application 108 has been instructed to test. By way of example and not limitation, illustrative tests include throughput tests, latency tests, call tests, short message system ("SMS") tests, multiple radio access bearer ("mRAB") tests (i.e., simultaneous voice and data tests), voice over Internet protocol ("VoIP"), video mean opinion score ("MOS"), or idle tests. In some embodiments, a test includes the collection of diagnostic data that can then be used by an engineer or other individual or entity associated with the wireless service provider that provides the wireless communications network 106 or the other network(s) being tested to troubleshoot one or more operational aspects thereof.

In some embodiments, the mobile devices 102 are configured with an operating system such as, but not limited to, SYMBIAN OS from SYMBIAN LIMITED, WINDOWS MOBILE OS from MICROSOFT CORPORATION, WINDOWS PHONE OS from MICROSOFT CORPORATION, PALM WEBOS from HEWLETT PACKARD CORPORATION, BLACKBERRY OS from RESEARCH IN MOTION LIMITED, IOS from APPLE INC., and ANDROID OS from GOOGLE INC. In some embodiments, the test client application 108 is integrated within the functionality provided by the operating system of the mobile device 102. In some embodiments, the test client application 108 is configured to execute on top of the operating system. In some embodiments, the test client application 108 is configured to utilize one or more application programming interfaces ("APIs") of the operating system and/or another application executing on the mobile devices 102.

In some embodiments, the test client application 108 is configured to perform one or more tests per instructions received from the RTC system 104 and to provide test results of the one or more tests to the RTC system 104. In some embodiments, the test client application 108 also is configured to receive instructions through input received by the mobile device 102. In these embodiments, an engineer or other individual or entity associated with the wireless service provider that provides the wireless communications network 106 or the other network(s) can utilize the test client application 108 to select a mode of control.

The mode of control may be manual testing, whereby a test is performed on the mobile device 102 in response to a request to initiate the test received via direct input to the mobile device 102. The test client application 108 may then provide for the selection of one or more tests to perform and for the input of test settings for the test(s).

The mode of control may allow remote control, whereby the mobile device 102 is rendered available for testing and a notification identifying the available for testing status of the mobile device 102 can be sent to the RTC system 104. The mobile device 102 is then controllable via the RTC system 104 for performing tests.

The mode of control may be prompted remote control, whereby the mobile device 102 receives a notification from the RTC system 104 to "wake-up" and be ready for receipt of instructions to perform one or more tests.

In some embodiments, instructions to perform one or more tests are sent to one or more of the mobile devices 102. These instructions may include instructions to attach to the wireless communications network 106 (if the mobile device 102 is not already attached thereto), perform one or more tests on the wireless communications network 106, and send test results of the one or more tests to the RTC 104 via the wireless communications network 106. Alternatively, in some embodiments, the instructions to perform the test include instructions to attach to the wireless communications network 106, perform one or more tests on the wireless communications network 106, and to attach to a second wireless communications network to send the test results of the test to the RTC system 104 via the second wireless communications network.

The wireless communications network 106 is illustrated as being in communication with the RTC system 104. The RTC system 104 is configured to execute a number of modules in order to perform various operations described herein. In the illustrated embodiment, the RTC system 104 is configured to execute a data analysis module 110, a user interface module 112, a test schedule module 114, a pending test module 116, a test result search module 118, a test results archive module 120, a real-time test results module 122, and a scheduled test results module 124 to perform various operations described herein. The modules may execute on a single RTC system 104 as in the illustrated embodiment, or in parallel across multiple RTC systems. In addition, each module may consist of a number of subcomponents executing on RTC systems or other computing systems or devices within, or in communication with, the RTC system 104. Two or more of the modules may be combined. The modules may be implemented as software, hardware, or any combination thereof.

The data analysis module 110 is configured to analyze test results to create one or more graphical representations of the test results. A graphical representation may include, but are not limited to, a table, spreadsheet, column chart, line chart, pie chart, bar chart, area chart, scatter chart, surface chart, doughnut chart, bubble chart, image, icon, map, text, any combination thereof, or the like.

The user interface module 112 is configured to generate and/or manage user interface elements to receive instructions to initiate tests, schedule tests, view test results, search test results, and to perform other operations described herein with reference to FIGS. 6A-6F, 7, 8A-8B, 9A-9C, 10A-10C, and 11A-11G. The user interface module 112 is configured to communicate with the data analysis module 110 to receive graphical representations of the test results for presentation by the RTC system 104. The user interface module 112 is also configured to receive input or other interactions via the user interface elements to instruct one or more of the illustrated modules to perform various operations, such as described herein below.

The test schedule module 114 is configured to schedule of one or more tests to be performed by one or more of the mobile devices 102. The test schedule module 114 is configured to provide test scheduling information to the user interface module 112 to facilitate the scheduling of tests via a user interface, as will be described in greater detail below with reference to FIGS. 6A-6F. In some embodiments, the test schedule module 114 facilitates the scheduling of a test via a location in which the test is to be performed. The granularity with which a location is selected can be any granularity including, for example, state, city, zip code, neighborhood, street, highway, interstate, or the like. After a location is selected, the test schedule module 114 may allow a user to select one or more mobile devices within that location to use for the test and to setup test details, such as which tests to perform and the date and time of the tests.

The pending test module 116 is configured to manage pending tests. Pending tests are tests for which the instructions have been sent to one or more of the mobile devices 102. Management of pending tests may include, for example, editing or deleting pending tests. The pending test module 116 is configured to provide pending test information to the user interface module 112 to facilitate the scheduling of tests via a user interface, as will be described in greater detail below with reference to FIG. 7.

The test results search module 118 is configured to search a test results data store 126 for test results of one or more tests that have been performed by one or more of the mobile devices 102. The user interface module 112 is configured to receive search queries and/or other search related information and provide this information to the test results search module 118 so that the test results search module 118 can perform searches of the test results data store 126 based upon the search queries and/or other search related information, as will be described in greater detail below with reference to FIGS. 11A-11G.

The test results archive module 120 is configured to archive test results in the test results data store 126. The test results archive module 120 is also configured to access the test results data store 126 to obtain archived test results and to provide the archived test results to the user interface module 112 to facilitate the viewing of archived test results via a user interface, as will be described in greater detail below with reference to FIGS. 10A-10C. Alternatively, the user interface module 112 may obtain archived test results directly from the test results data store 126.

The real-time test results module 122 is configured to receive real-time test results from one or more of the mobile devices 102 and to provide the real-time test results to the user interface module 112 for presentation in a user interface, as will be described in greater detail below with reference to FIGS. 8A-8B.

Real-time is defined herein as the actual time during which a process or event occurs. In the aforementioned embodiments, the RTC system 104 and, more particularly, the real-time test results module 122, receives and presents the test results in real-time, meaning the test results are available for presentation within milliseconds so that it is available virtually immediately as feedback. Real-time is also used herein interchangeably with live and instantaneous. The present inherent latencies of communications and computer processes may prevent real-time processes, such as the receipt and presentation of test results, from occurring within an infinitesimal amount of time. It should be understood, however, that real-time is also used herein to broadly encompass zero time and any time that approaches zero as a limit.

The scheduled test results module 124 is configured to receive scheduled test results. The scheduled test results may be received from the real-time test results module 122 or may be received directly from one or more of the mobile device(s) 102. For instance, the scheduled test results module 124 may receive the scheduled test results in real-time or may be delayed a specific or arbitrary time. The scheduled test results search module 118 is configured to provide scheduled test results to the test results data store 126 for storage, to retrieve schedule test results from the scheduled test results data store 126, and to provide the scheduled test results to the user interface module 112 for presentation in a user interface, as will be described in greater detail below with reference to FIGS. 9A-9C. Alternatively, the user interface module 112 may obtain scheduled test results directly from the test results data store 126.

The test results data store 126, as briefly described above, is configured to store test results received from the real-time test results module 122 and/or the scheduled test results module 124, to provide test results to the real-time test results module 122, the scheduled test results module 124, and to provide the test results directly to the user interface module 112 upon request or automatically.

Figure 2:
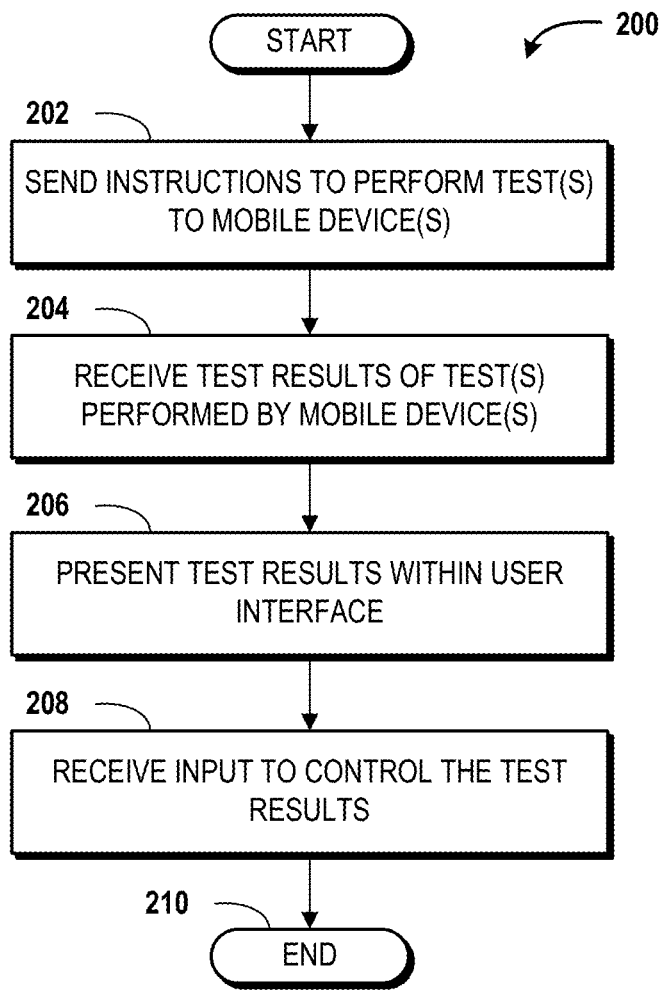
FIG. 2 is a flow diagram showing aspects of a method for testing wireless communications networks remotely via one or more mobile devices, according to an illustrative embodiment.

Turning now to FIG. 2, a flow diagram showing aspects of a method 200 for testing a wireless communications network remotely via a mobile device will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, wireless devices, mobile devices, minicomputers, mainframe computers, personal computers, hand-held computing devices, processor-based, programmable consumer electronics, combinations thereof, and the like.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The method 200 begins and proceeds to operation 202, wherein the RTC system 104 sends instructions to perform one or more tests to one or more of the mobile devices 102. For ease of explanation, the remaining operations of the method 200 will be described in context of one test and one mobile device, referred to herein below for simplicity as the mobile device 102. It should be understood, however, that any number of tests and/or any number of mobile devices may be used in performing the method 200 and/or the other methods described herein below.

From operation 202, the method 200 proceeds to operation 204, wherein the RTC system 104 receives test results of the test performed by the mobile device 102. In some embodiments, the test results are received in real-time by the real-time results module 122. In these embodiments, the real-time results module 122 may then provide the real-time test results to the user interface module 112 for presentation within a user interface at operation 206. The real-time results module 122 also may provide the real-time test results or, more particularly, a copy thereof to the test results data store 126 for storage as archived test results and for later retrieval by the test result archive module 120 and/or the user interface module 112.

In some embodiments, the test results are received by the scheduled test results module 124. In these embodiments, the scheduled test results module 124 may receive the test results from the real-time results module 122 in real-time or with some delay. In these embodiments, the scheduled test results module 124 alternatively may receive the test results from the mobile device 102, wherein the test results are sent by the mobile device 102 to the RTC system 104 after some delay; that is, not in real-time. In any case, the scheduled test results module 124 may then provide the scheduled test results to the user interface module 112 for presentation within a user interface at operation 206. The scheduled test results module 124 also may provide scheduled test results, or more particularly, a copy thereof to the test results data store 126 for storage as archived test results and for later retrieval by the test result archive module 120 and/or the user interface module 112.

Figure 3:
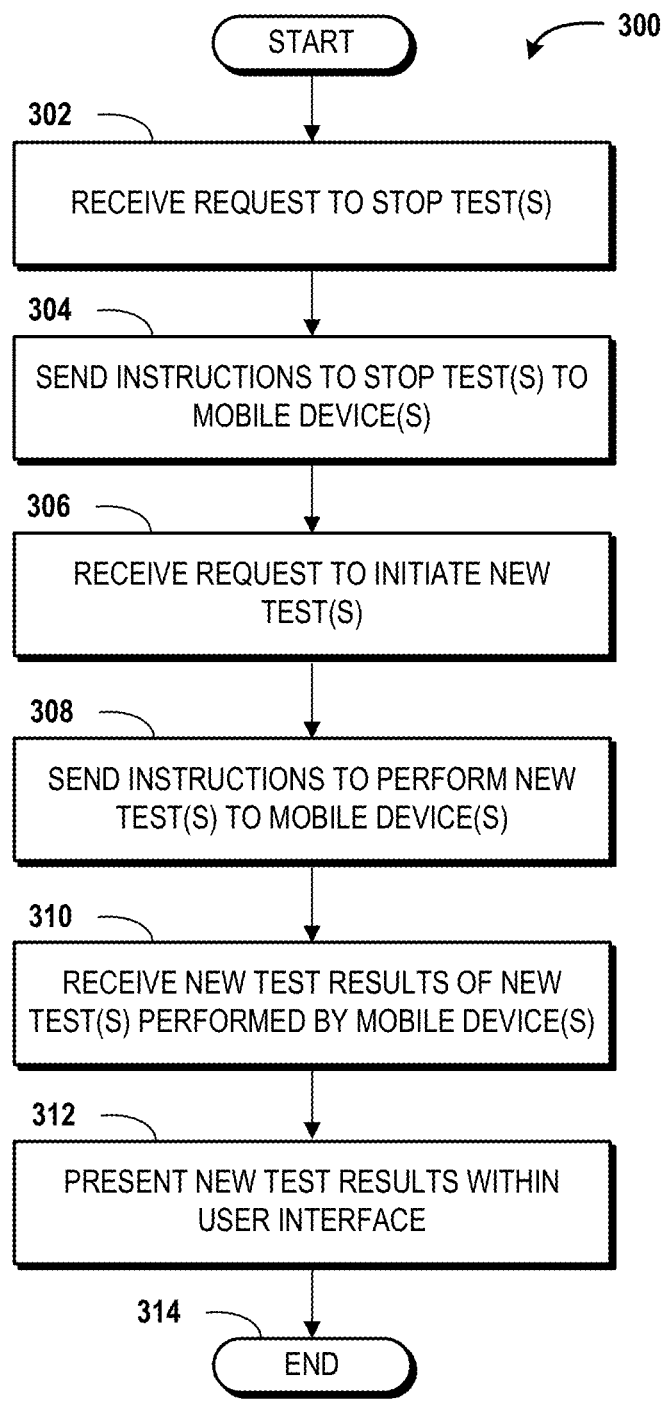
FIG. 3 is a flow diagram showing aspects of a method for stopping a test being performed remotely via one or more mobile devices, according to an illustrative embodiment.
Figure 4:
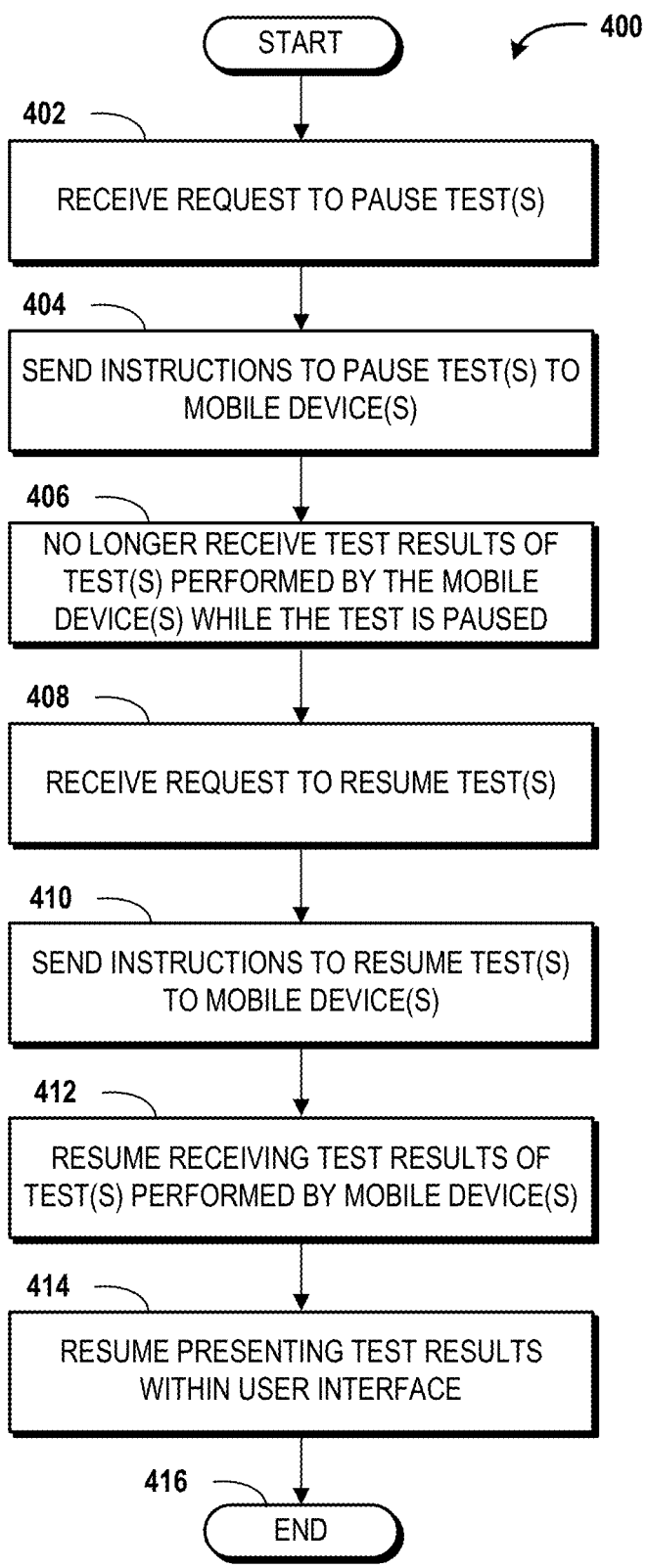
FIG. 4 is a flow diagram showing aspects of a method for pausing a test being performed remotely via a mobile device, according to an illustrative embodiment.

From operation 206, the method 200 proceeds to operation 208, wherein the RTC system 104 receives an input to control the test results received at operation 204 and presented at operation 206. In some embodiments, the input to control the test results includes a request to stop the test. In these embodiments, in response to receiving the request to stop the test, the RTC system 104 sends instructions to stop the test to the mobile device and no longer receives the test results until the test is resumed, if at all. FIG. 3 and the description thereof provide additional details regarding the stop control. In some embodiments, the input to control the test results includes a request to pause the test. In these embodiments, in response to receiving the request to pause the test, the RTC system 104 sends instructions to pause the test to the mobile device 102 and no longer receives the test results of the test while the test is paused. In these embodiments, the RTC system 104 also receives a request to resume the test, sends instructions to resume the test to the mobile device 102, and then resumes receiving the test results of the test. FIG. 4 and the description thereof provide additional details regarding the pause control.

Another control of the test results provides for the export of test results to a document, such as a spreadsheet, word processing document, presentation, map, Web page, or any other document or file that can include the test results. It should be understood that the document need not be able to present the test results in human understandable form. For instance, the document may contain data that is readable by an application that is configured to utilize the data to present the test results in human understandable form. A non-limiting example would be a document that is useable by a mapping application to create a map of the test results, the document itself may not be understandable by a human, but the map created by the mapping application would be understandable by a human.

Another control of the test results provides for the manipulation of a graphical representation, such as a table, chart, graph, or other graphical representation such as described herein above. A manipulation be used to perform a function such as, but is not limited to, zoom-in, zoom-out, rotate, add contextual information, remove contextual information, edit the graphical representation, some combination thereof, or the like.

Other controls of the test results include, but are not limited to, play, fast forward, and rewind. This functionality is used, respectively, to playback test results such that the results can be viewed over a specified time, to advance forward through playback of the test results faster than by using the play control, or to rewind through the playback of the test results.

As explained above, to control test results can include the control of test results within a user interface, such as playback of test results, and/or the control of one or more tests that provide the test results.

From operation 208, the method 200 proceeds to operation 210. The method 200 ends at operation 210.

Turning now to FIG. 3, a method 300 for stopping a test being performed remotely via the mobile device 102 will be described, according to an illustrative embodiment. The method 300 begins and proceeds to operation 302, wherein the RTC system 104 receives a request to stop the test, such as via the user interface module 112. From operation 302, the method 300 proceeds to operation 304, wherein the RTC system 104 sends instructions to stop the test to the mobile device 102. In response to the instructions to stop the test, the test client application 108 stops the test and awaits further instructions, if any.

From operation 304, the method 300 proceeds to operation 306, wherein the RTC system 104 receives a request to initiate one or more new tests. For ease of explanation, it is assumed that the request received at operation 306 is a request to initiate one test, although the request may be to initiate multiple tests. Moreover, the new tests may be directed to the same mobile device as the test or to a different mobile device. It should be understood, however, that different tests may at least in part be used to perform troubleshooting functions and, as such, it may be beneficial in some cases to utilize the same mobile device so that a comparison of test results of the test to test results of the new test can be fairly drawn. The new test may be directed to a different mobile device if there is a problem with the mobile device 102 that is apparent from the test results of the test and that would indicate the test results are inaccurate or otherwise unusable because the test results do not offer a reliable source of information about operational aspects of the wireless communications network 106 or other network being tested.

From operation 306, the method 300 proceeds to operation 308, wherein the RTC system 104 sends instructions to perform the new test to the mobile device 102. At operation 310, in response to the instructions, the RTC system 104 receives new test results of the new test performed by the mobile device 102. The method 300 then proceeds to operation 312, wherein the RTC system 104 presents the new test results within a user interface, such as in a manner similar to presenting the test results described herein above with reference to operation 206 of FIG. 2.

From operation 312, the method 300 proceeds to operation 314. The method 300 ends at operation 314. Alternatively, from operation 312, the method 300 may receive further input to control the new test results. The further input to control the new test results may be similar to the input to control the test results as described herein above with reference to operation 208 of FIG. 2.

Turning now to FIG. 4, a method 400 for pausing a test being performed remotely via a mobile device will be described, according to an illustrative embodiment. The method 400 begins and proceeds to operation 402, wherein the RTC system 104 receives a request to pause the test, such as via the user interface module 112. From operation 402, the method 400 proceeds to operation 404, wherein the RTC system 104 sends instructions to pause the test to the mobile device 102. In response to the instructions to pause the test, the test client application 108 pauses the test and awaits further instructions, if any.

From operation 404, the method 400 proceeds to operation 406, wherein the RTC system 104 no longer receives test results of the test while the test is paused. From operation 406, the method 400 proceeds to operation 408, wherein the RTC system 104 receives a request to resume the test. From operation 408 the method 400 proceeds to operation 410, wherein the RTC system 104 sends instructions to resume the test to the mobile device 102. At operation 412, in response to the instructions, the RTC system 104 resumes receiving test results of the test. The method 400 then proceeds to operation 414, wherein the RTC system 104 resumes presenting the test results within a user interface, such as in a manner similar to presenting the test results described herein above with reference to operation 206 of FIG. 2.

From operation 414, the method 400 proceeds to operation 416. The method 400 ends at operation 416. Alternatively, from operation 414, the method 400 may receive further input to control the test results. The further input to control the test results may be similar to the input to control the test results as described herein above with reference to operation 208 of FIG. 2.

Figure 5:
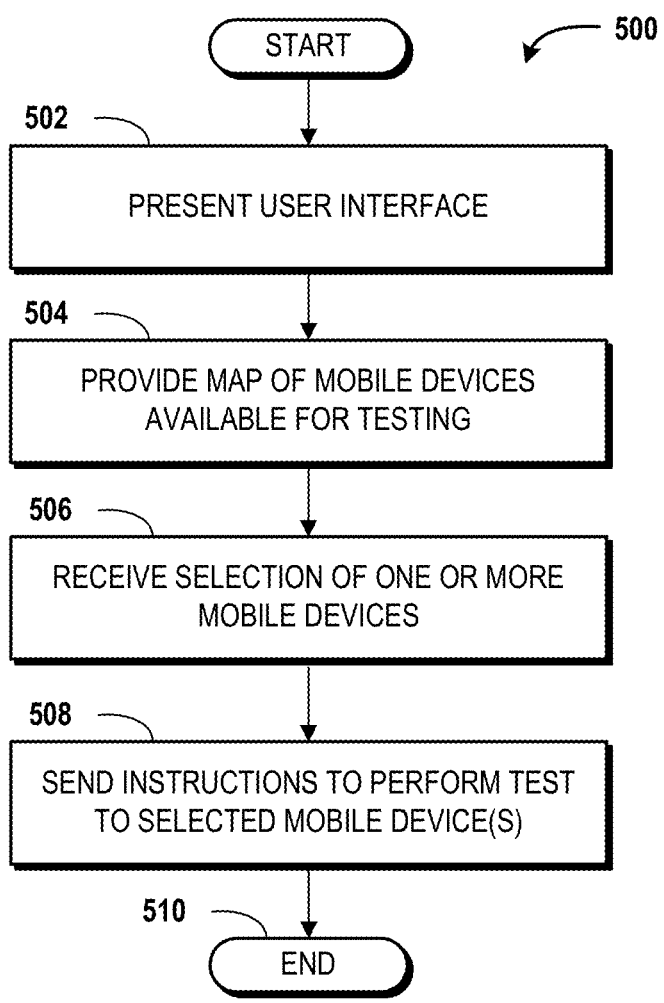
FIG. 5 is a flow diagram showing aspects of a method for selecting one or more mobile devices to be used for testing, according to an illustrative embodiment.

Turning now to FIG. 5, a method 500 for selecting one or more mobile devices to be used for testing a wireless communications network will be described, according to an illustrative embodiment. The method 500 is described in context of the mobile device 102 being made available for selection. It should be understood, however, that any number of mobile devices configured with the test client application 108 may be made available for selection depending upon the control mode that is active for a particular mobile device.

The method 500 begins and proceeds to operation 502, wherein the RTC system 104 and, more particularly, the user interface module 112 presents a user interface. From operation 502, the method 500 proceeds to operation 504, wherein the RTC system 104 provides a map of the mobile devices 102 that are available for testing. In addition to the mobile devices 102 that are available for testing, in some embodiments, the map may include devices that are not available for testing, such as those in the manual testing control mode, and/or devices that are available to be prompted for testing, such as those in the prompted remote control mode. Selection of a device in the prompted remote control mode, in some embodiments, initiates an SMS message that is directed to the device to wake-up the device prior to or along with instructions to perform one or more tests.

From operation 504, the method 500 proceeds to operation 506, wherein the RTC system 104 receives a selection of one or more mobile devices from the map. One or more tests and parameters thereof may be specified. The method 500 then proceeds to operation 508, wherein the RTC system 104 sends instructions to perform one or more tests to the selected mobile devices. The method 500 then proceeds to operation 510 and the method 500 ends.

Figure 6A:
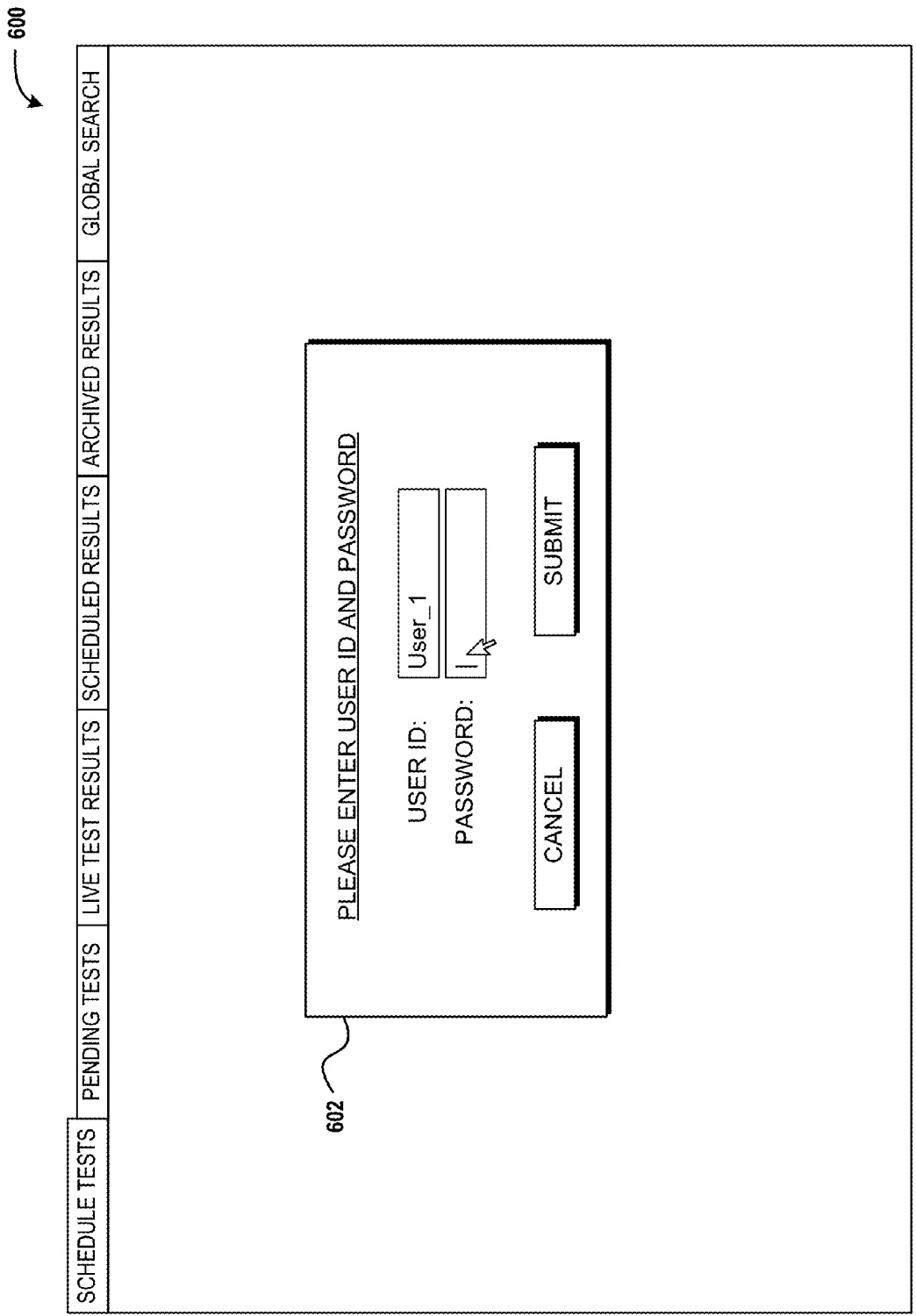
FIGS. 6A-6F are user interface diagrams illustrating an illustrative user interface for scheduling tests, according to embodiments presented herein.

Turning now to FIGS. 6A-6F and first to FIG. 6A, an illustrative schedule test user interface 600 will be described, according to an illustrative embodiment. In the illustrated embodiment, the schedule test user interface 600 is provided as tab dedicated to user interface features for scheduling tests to be performed by one or more mobile devices. The schedule test user interface 600, in other embodiments, is a dedicated user interface for scheduling tests to be performed by one or more mobile devices. In some embodiments, the schedule test user interface 600 is provided on a display that is communicatively coupled to the RTC system 104. In some embodiments, the schedule test user interface 600 is provided to a Web server for inclusion as a Web page or as part of a Web page. In some embodiments, the RTC system 104 functions in part as the Web server. Alternatively, the RTC system 104 provides the schedule test user interface 600 to the Web server.

The illustrated schedule test user interface 600 includes a credentials prompt 602. The credentials prompt 602 prompts a user, such as an engineer, individual, or other entity that desires to utilize the RTC system 104, to input credentials to gain access to the RTC system 104. In the illustrated embodiment, the credentials prompt 602 prompt a user for a user identification ("user ID") and password. Other credentials are contemplated. Moreover, although the credentials prompt 602 is shown specifically via the schedule test user interface 600, the credentials prompt 602 may be shown in any of the below described user interfaces and may be used repeatedly to authenticate the user's access to particular data presented via the RTC system 104. In some embodiments, a user ID is associated with pending tests, scheduled tests, and/or test results.

Figure 6B:
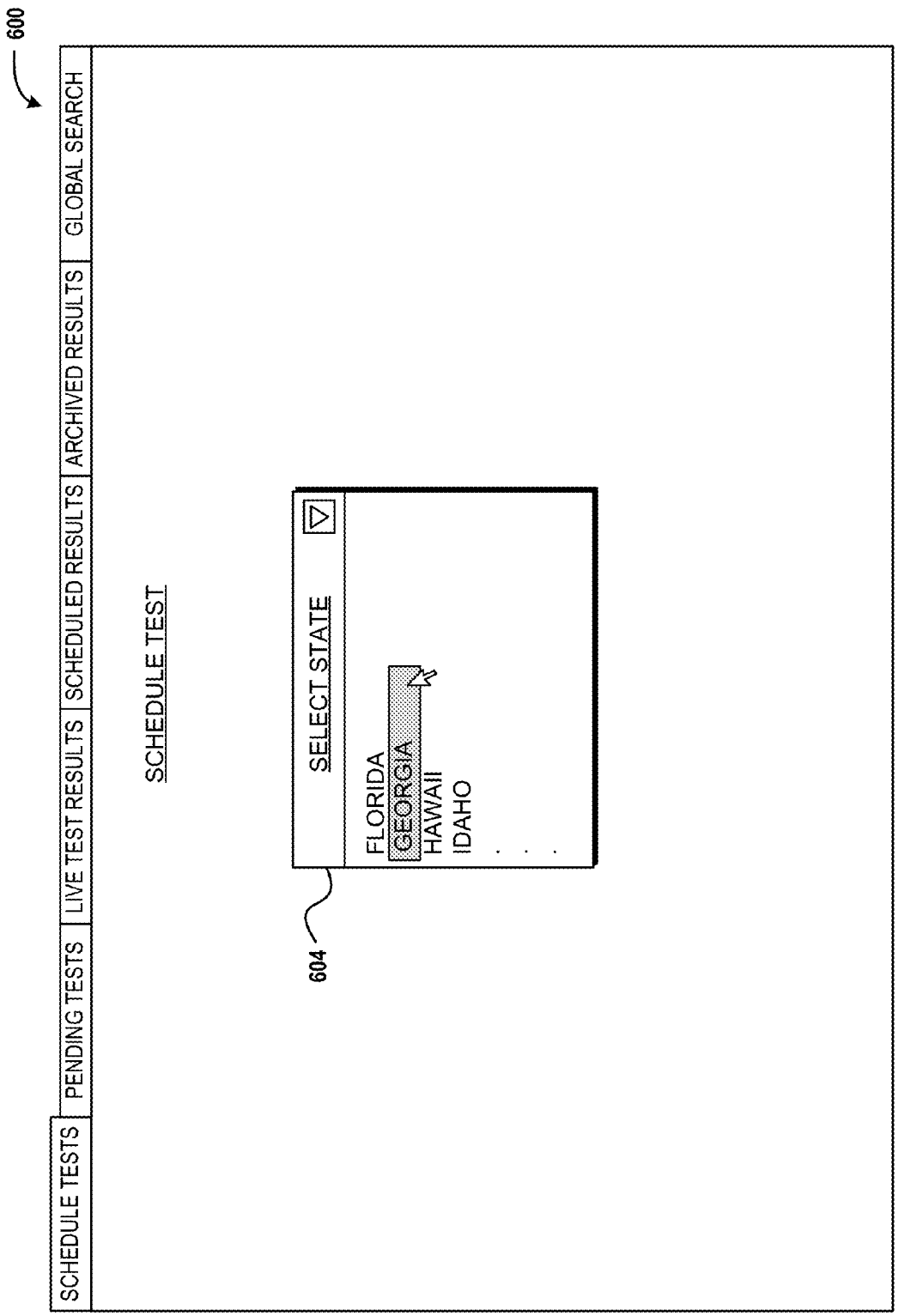

Turning now to FIG. 6B, the schedule test user interface 600 includes a location selection menu 604. The location selection menu 604 allows a user to select a location in which the user desires to perform one or more tests. In the illustrated embodiment, the location selection menu 604 is a drop-down menu that provides the available states in which to perform one or more tests, with the state of "Georgia" having been selected. It should be understood that the location selection menu 604 alternatively may contain more or less granular location selection. Moreover, although the illustrated location selection menu 604 is a drop-down menu, another type of menu system, prompt, or field may be used to acquire a location in which the user desires to perform one or more tests. In some embodiments, additional menus, other prompts, or fields are added to facilitate a more or less granular location selection. For instance, another drop-down menu may be added to include the selection of a particular city within a selected state. The illustrated embodiment shows the selection of a location from the location selection menu 604 via a mouse cursor. Selection of a location may occur through other mechanisms including, but not limited to, voice, single touch, multi-touch, touch gestures, keyboard, joystick, or some combination thereof.

Figure 6C:
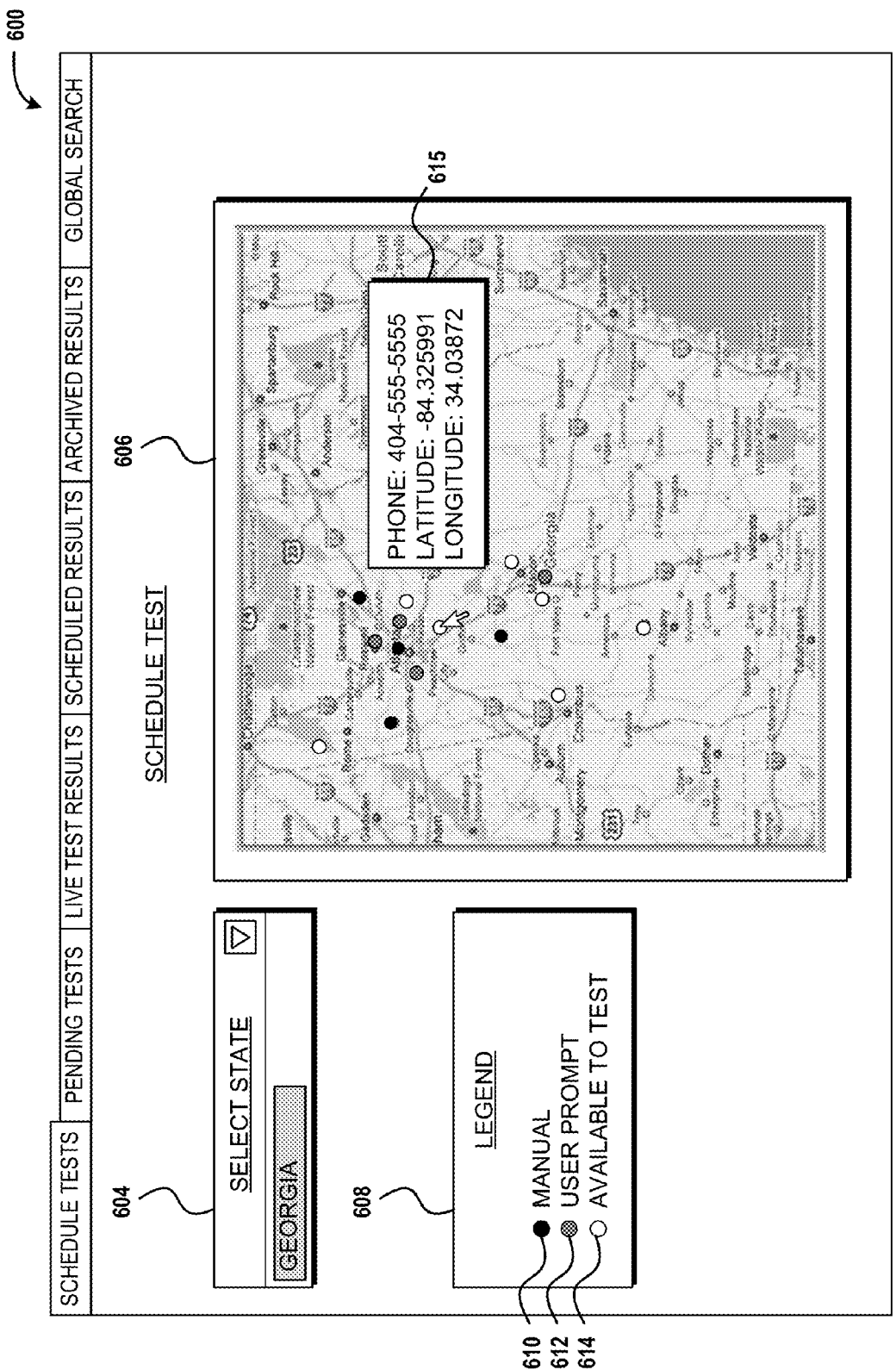

Turning now to FIG. 6C, the schedule test user interface 600 includes the location selection menu 604, a map interface 606 that shows the selected location, which, in the illustrated embodiment, is the state of "Georgia," and a legend 608. The legend 608 includes a manual control mode identifier 610, a user prompt control mode identifier 612, and an available to test identifier 614 to identify different statuses of a plurality of mobile devices currently located with the state of "Georgia." In the illustrated embodiment, one of the mobile devices that is available to test has been selected. Upon selection the map interface 606 shows an information overlay 615 that, in the illustrated embodiment, shows a telephone number associated with the selected mobile device and the location of the selected mobile device in latitude and longitude coordinate. It is contemplated that the information overlay 615 may include more or less contextual information. Additional contextual information may include, but is not limited to, mobile device battery power, number of tests performed within a time period, type of tests performed within a time period, type of tests available to be performed, manufacturer, model, serial number, international mobile equipment identity ("IMEI"), and one or more users associated with the device.

Figure 6D:
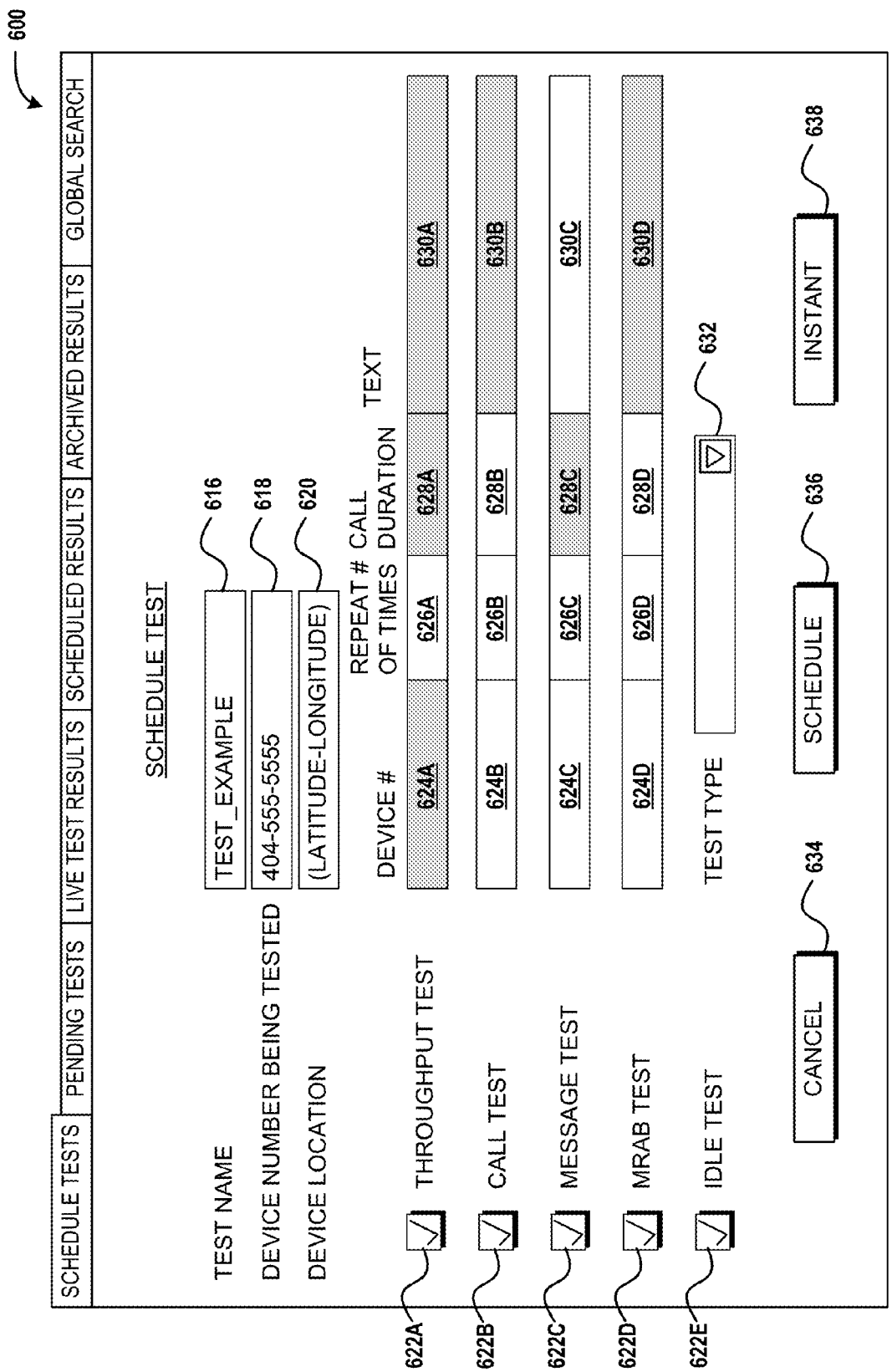

Turning now to FIG. 6D, the schedule test user interface 600 includes a test name field 616 for input of a name of a test, a device number field 618 for input of a device number associated with the selected device, and a device location field 620 for input of a location of the selected device. The test name field 616, the device number field 618, and/or the device location field 620 may be automatically populated or manually populated. Moreover, these fields and the remainder of the information shown in FIG. 6D may be requested for each mobile device that is to be used to perform a test. These fields may also be configured to accept input for multiple selected mobile devices simultaneously to facilitate batch processing of tests. In the illustrated embodiment of FIG. 6D, the schedule user interface 600 also includes test description information 622, a contacted device number field 624, a repeat test field 626, a call duration field 628, a text field 630, a test type selection menu 632, a cancel button 634, a schedule button 636, and an instant button 638.

The test description information 622A identifies a throughput test that has been selected as indicated by the checked checkbox, the contacted device number field 624A is grayed out to indicate that a contacted device number is not needed for the throughput test, the repeat test field 626A allows for input of a number of times the throughput test is to be repeated, the call duration field 628A is grayed out to indicate that a call duration is not needed for the throughput test, and the text field 630A is also grayed out to indicate that text is not needed for the throughput test.

The test description information 622B identifies a call test that has been selected as indicated by the checked checkbox, the contacted device number field 624B allows for input of a telephone number of a device that is to be contacted for the call test, the repeat test field 626B allows for input of a number of times the call test is to be repeated, the call duration field 628B allows for input of a duration for a call to be used during the call test, and the text field 630B is grayed out to indicate that text is not needed for the call test.

The test description information 622C identifies a message test that has been selected as indicated by the checked checkbox, the contacted device number field 624C allows for input of a telephone number of a device that is to be contacted for the message test, the repeat test field 626C allows for input of a number of times the message test is to be repeated, the call duration field 628C is grayed out to indicate that a call duration is not needed for the message test, and the text field 630D allows for input of text to be included in the messages used for the message test.

The test description information 622D identifies an MRAB test that has been selected as indicated by the checked checkbox, the contacted device number field 624D allows for input of a telephone number of a device that is to be contacted for the MRAB test, the repeat test field 626D allows for input of a number of times the MRAB test is to be repeated, the call duration field 628D allows for input of a duration for a call to be used during the MRAB test, and the text field 630D is grayed out to indicate that text is not needed for the MRAB test.

The test description information 622E identifies an idle test that has been selected as indicated by the checked checkbox. Since the idle test is a test of the idle state of the selected mobile device, the idle test does not include any of the aforementioned fields, although the aforementioned fields may be displayed grayed out.

The test type selection menu 632 allows for the selection of which network type to test for a throughput test. In some embodiments, the network type selections include a mobile telecommunications data network and a WI-FI network. In some embodiments, the network type selections include different specific mobile telecommunications data networks and/or WI-FI networks such that a user can specify exactly which network to test.

Selection of the cancel button 634 clears the aforementioned fields, if applicable. In some embodiments, selection of the cancel button 634 returns the user to the schedule test user interface 600 shown in FIG. 6C.

Figure 6E:
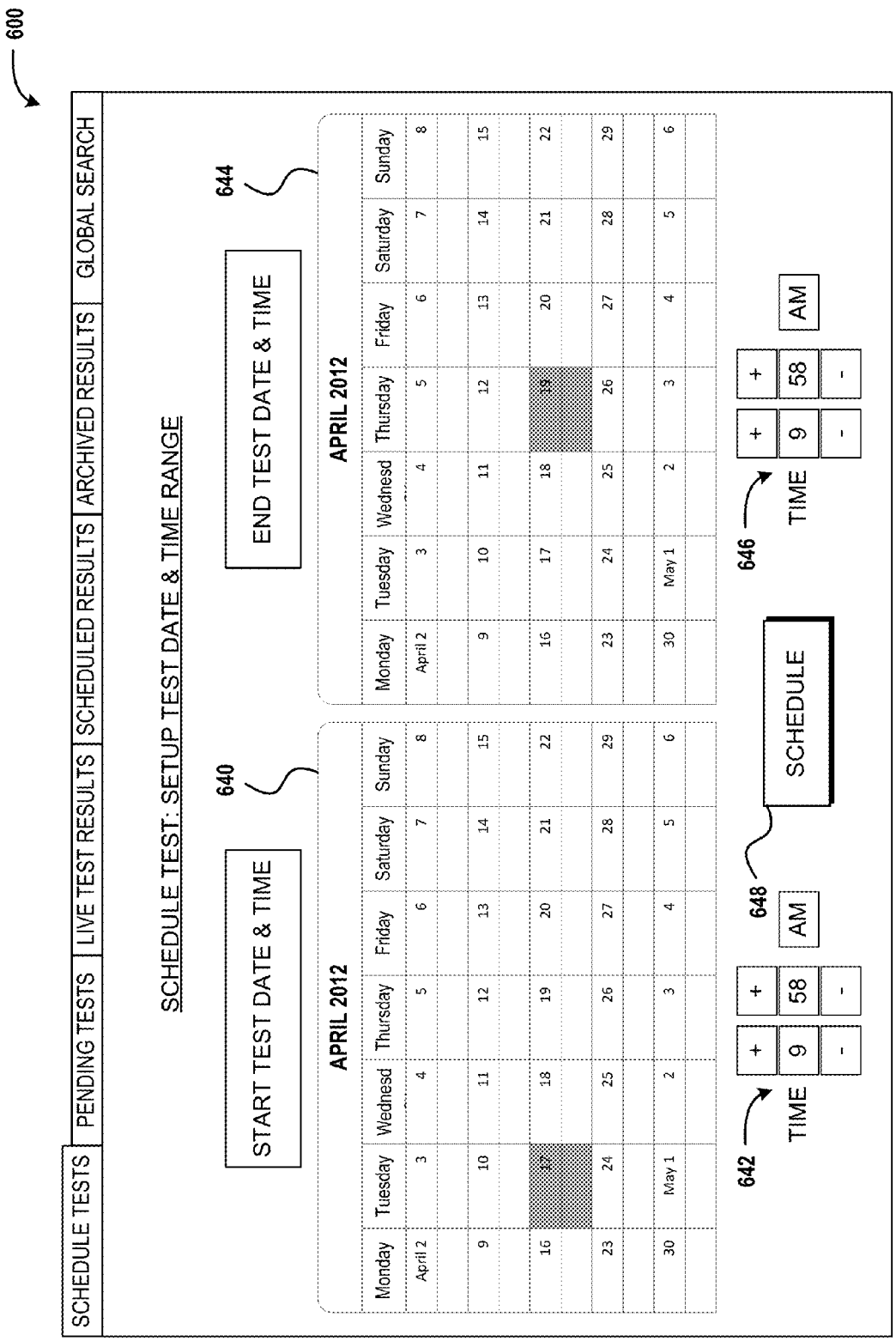

Selection of the schedule button 636 causes the schedule test user interface 600 to change to the view shown in FIG. 6E so that the user can enter date and time information for the test. Selection of the instant button 638 will initiate the test and cause the schedule test user interface 600 to change to the view shown in FIG. 6F.

Turning now to FIG. 6E, the schedule test user interface 600 includes a start test date selection interface 640, a start test time selection interface 642, a stop test date selection interface 644, and a stop test time selection interface 646 for facilitating the selection of a start test date, a start test time, a stop test date, and a stop test time, respectively, for the test. It should be understood that the other mechanisms to facilitate the selection of a start test date, a start test time, a stop test date, and a stop test time are contemplated. The schedule test user interface 600 shown in FIG. 6E also includes the schedule button 648. Selection of the schedule button 648 causes the schedule test user interface 600 to change to the view shown in FIG. 6F.

Figure 6F:
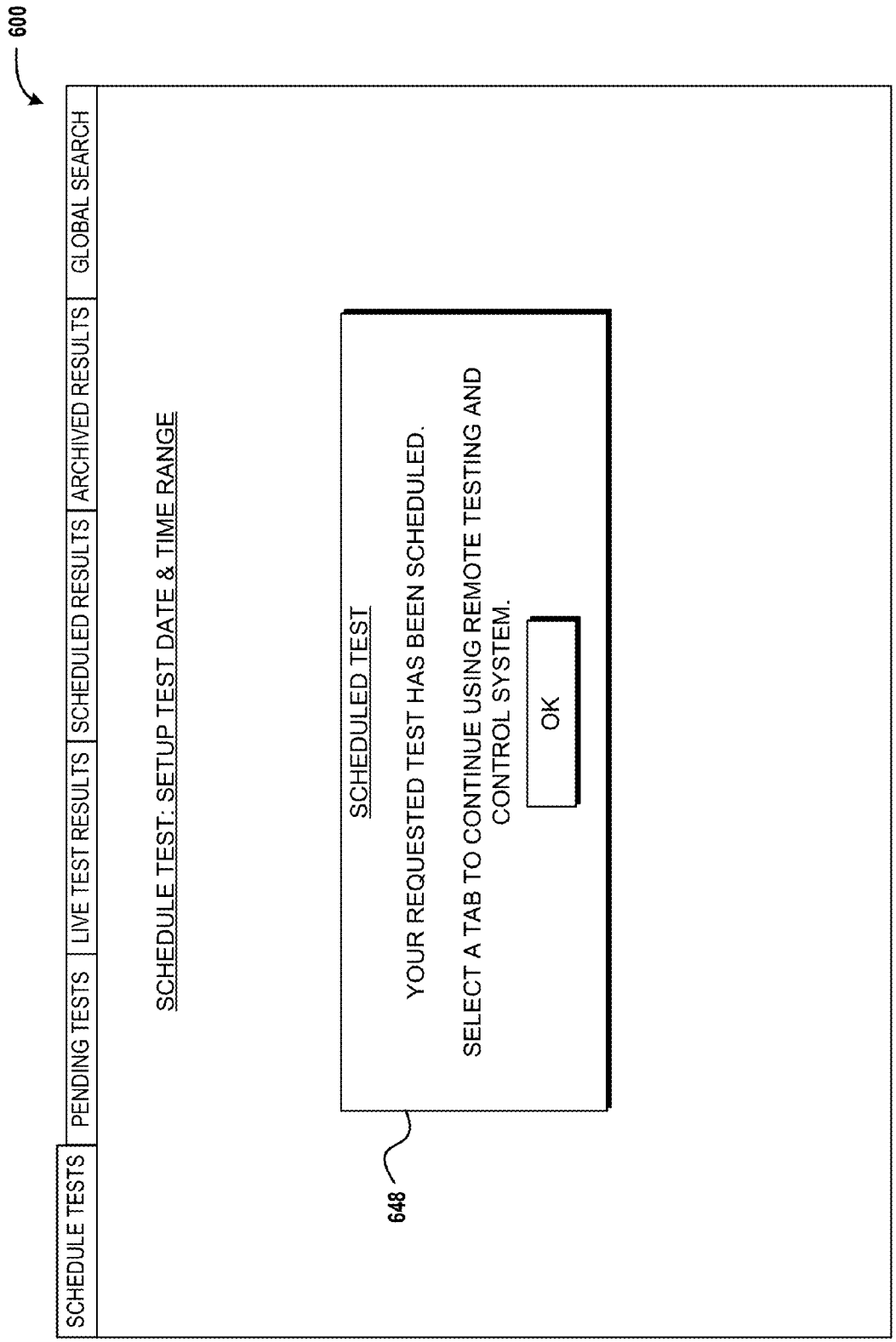

Turning now to FIG. 6F, the schedule test user interface 600 includes a scheduled test notification to notify the user that the requested test has been scheduled. In the illustrated embodiment, the user may select a tab to continue using the RTC system 104.

Turning now to FIG. 7, an illustrative pending test management user interface 700 will be described, according to an illustrative embodiment. In the illustrated embodiment, the pending test management user interface 700 is provided as a tab dedicated to user interface features for managing pending tests to be performed by one or more mobile devices. The pending test management user interface 700, in other embodiments, is a user interface dedicated to managing pending tests to be performed by one or more mobile devices. In some embodiments, the pending test management user interface 700 is provided on a display that is communicatively coupled to the RTC system 104. In some embodiments, the pending test management user interface 700 is provided to a Web server for inclusion as a Web page or as part of a Web page. In some embodiments, the RTC system 104 functions in part as the Web server. Alternatively, the RTC system 104 provides the pending test management user interface 700 to the Web server.

The illustrated pending test management user interface 700 includes a test device number column 702, a nick name column 704, a start date column 706, a start time column 708, a stop date column 710, a stop time column 712, an edit button 714, a delete button 716, and a cancel button 718. The test device number column 702 includes the telephone numbers of the devices that have pending tests associated therewith. The nick name column 704 includes the nick names of the tests. The start date column 706 includes the start dates of the tests. The start time column 708 includes the start times of the tests. The stop date column 710 includes the stop dates of the tests. The stop time column 712 includes the stop time of the tests.

Selection of the edit button 714 allows a user to edit information for a selected test, which, in the illustrated embodiment is the second test with the nick name "Alpharetta 2." Selection of the delete button 716 allows a user to delete a selected test. Selection of the cancel button 718 allows a user to clear a selection, abort a delete operation, and/or abort an edit operation.

Figure 8A:
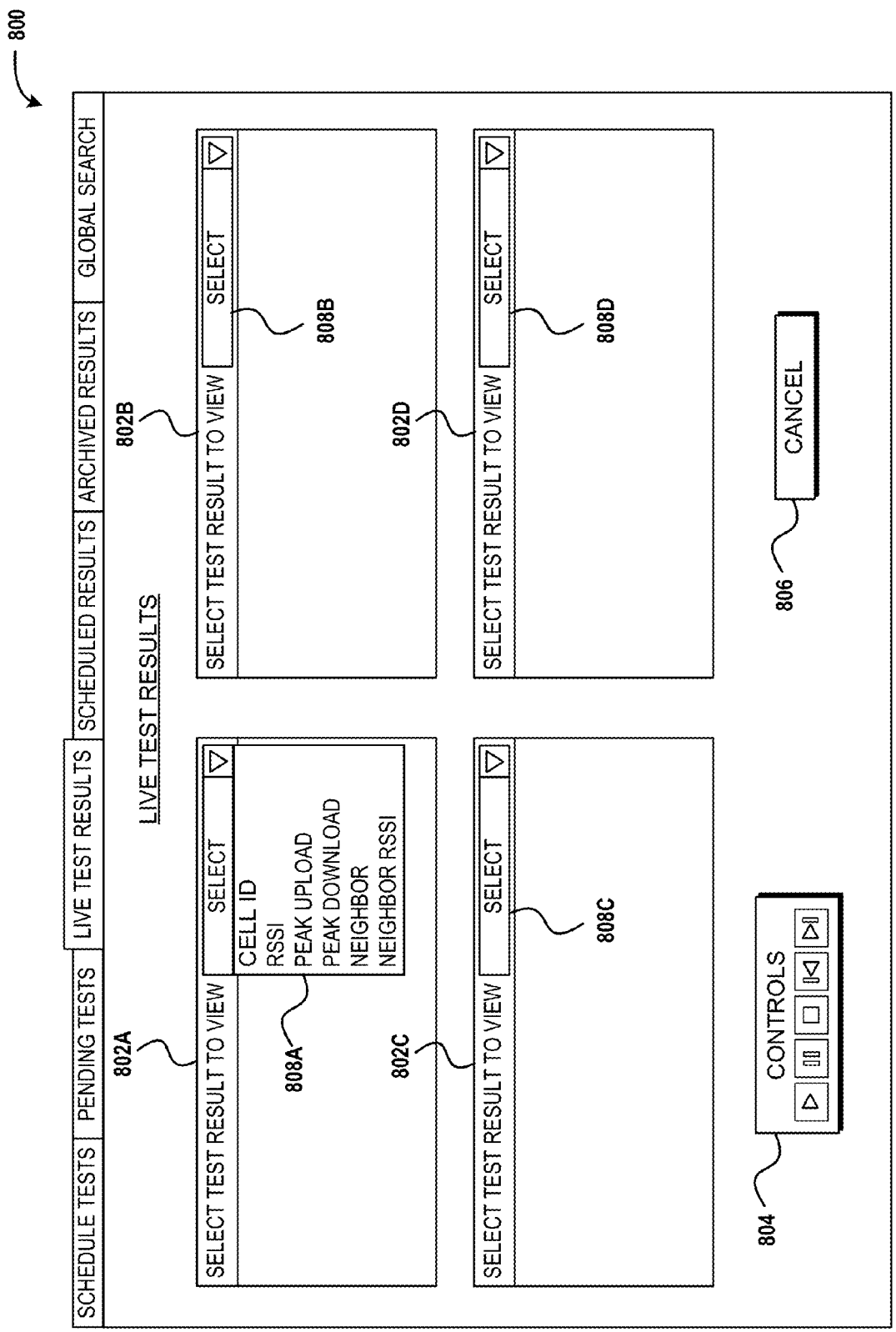
FIGS. 8A-8B are user interface diagrams illustrating an illustrative user interface for presenting real-time (live) test results, according to embodiments presented herein.
Figure 8B:
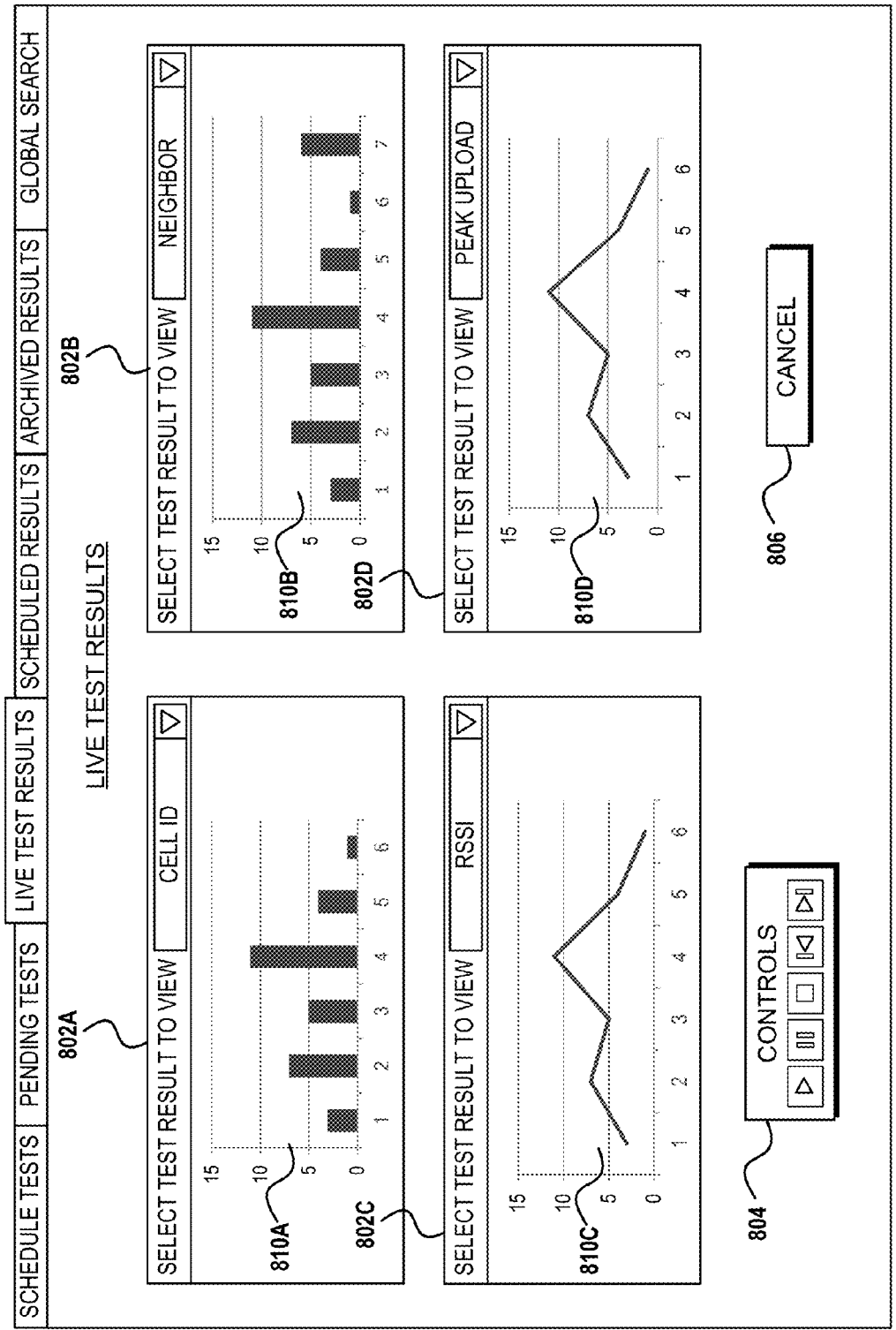

Turning now to FIGS. 8A-8B and first to FIG. 8A, a live test results user interface 800 will be described, according to an illustrative embodiment. In the illustrated embodiment, the live test results user interface 800 is provided as a tab dedicated to user interface features for presenting live test results. As noted herein above, live test results are the same as real-time test results. The live test results user interface 800, in other embodiments, is a user interface dedicated to user interface features for presenting live test results. In some embodiments, the live test results user interface 800 is provided on a display that is communicatively coupled to the RTC system 104. In some embodiments, the live test results user interface 800 is provided to a Web server for inclusion as a Web page or as part of a Web page. In some embodiments, the RTC system 104 functions in part as the Web server. Alternatively, the RTC system 104 provides the live test results user interface 800 to the Web server.

The illustrated live test results user interface 800 includes a plurality of test result viewer interfaces 802, a controls interface 804, and a cancel button 806. The test result viewer interfaces 802 allow a user to select test results for from a test selection menu 808. More particularly, a first test result viewer interface 802A includes a first test selection menu 808A, a second test result viewer interface 802B includes a second test result viewer interface 808B, a third test result viewer interface 802C includes a third test result viewer interface 808C, and a fourth test result viewer interface 802D includes a fourth test result viewer interface 808D. It is contemplated that more or less of test result viewer interfaces 802 may be presented within the live test results user interface 800. The number of test results viewer interfaces 802 may be set by default and changed by the user. In some embodiments, the user can add or delete test results viewer interfaces 802, move the test results viewer interfaces 802 around the live test results user interface 800, and otherwise manipulate the test results viewer interfaces 802 such as expanding, shrinking, minimizing, or maximizing the test results viewer interfaces 802. Full-screen views of one or more test results viewer interfaces 802 are also contemplated.

The controls interface 804 allows a user to play test results by the selection of the play icon, pause test results by the selection of the pause icon, stop by the selection of the stop icon, rewind test results by the selection of the rewind icon, and fast forward test results by the selection of the fast forward icon. It should be understood that the fast forward icon may only be available if the current view of the test results is at a time before a present time during which the live results are being presented. Selection of the cancel button 806 allows a user to clear a selection, cancel a current operation, revert to a previous user interface, or some other functionality to cancel a previous operation.

Turning now to FIG. 8B, the live test results user interface 800 includes the plurality of test result viewer interfaces 802, the controls interface 804, and the cancel button 806. The test result viewer interfaces 802 in FIG. 8B each include a graphical representation 810 of the selected test results. More particularly, the first test result viewer interface 802A includes a first graphical representation of cell ID test results, the second test result viewer interface 802B includes a second graphical representation 810B of neighbor cell test results, the third test result viewer interface 802C includes a third graphical representation 810C of received signal strength indication ("RSSI") test results, and the fourth test result viewer interface 802D includes a fourth graphical representation 810D of peak upload test results. Although specific test results are shown, these should not be interpreted as being limiting in any way, nor should the type of graphical representations shown.

The controls interface 804 allows a user to play test results by the selection of the play icon, pause test results by the selection of the pause icon, stop by the selection of the stop icon, rewind test results by the selection of the rewind icon, and fast forward test results by the selection of the fast forward icon. Selection of the cancel button 806 allows a user to clear a selection, cancel a current operation, revert to a previous user interface, or some other functionality to cancel a previous operation.

Figure 9A:
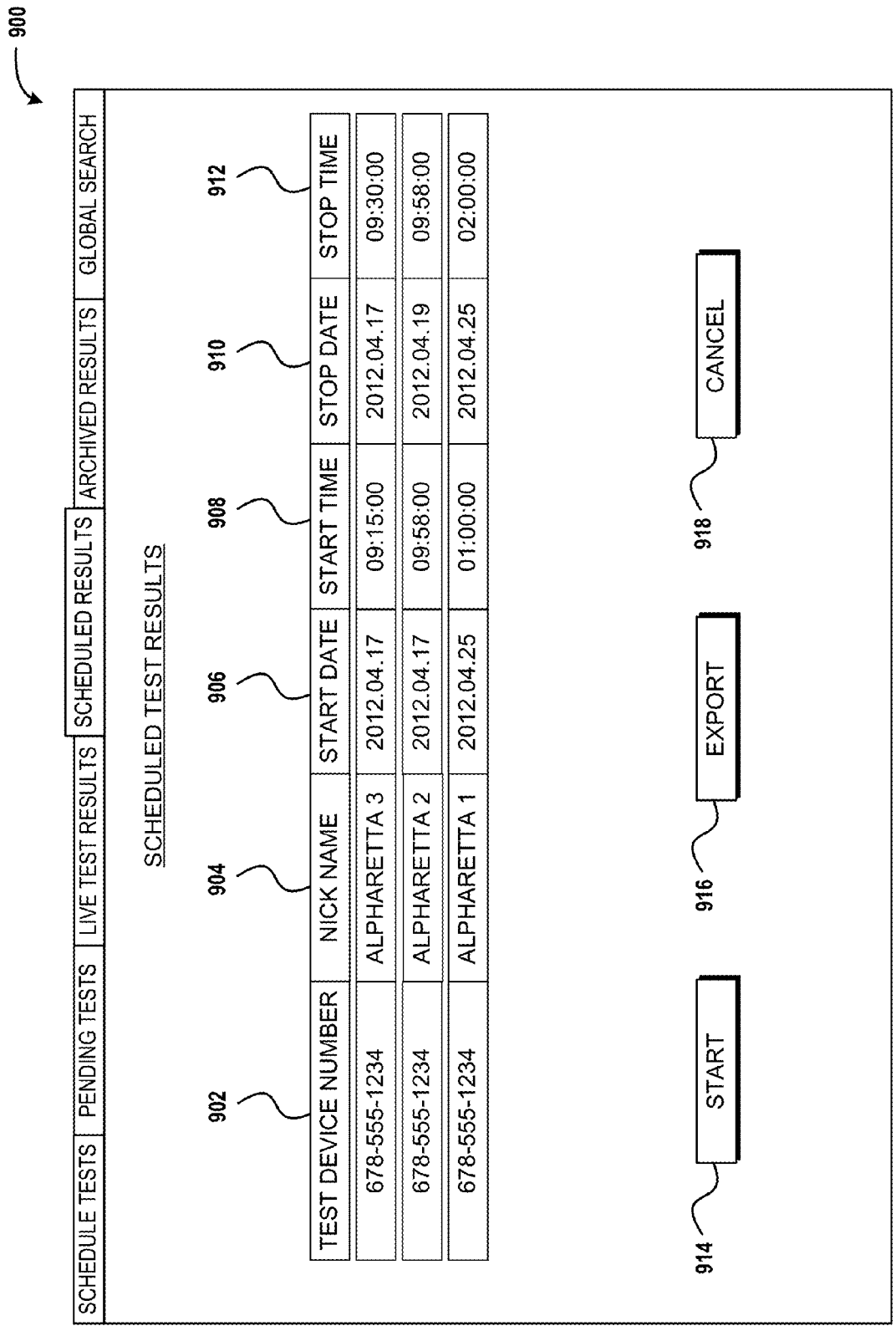
FIGS. 9A-9C are user interface diagrams illustrating an illustrative user interface for presenting scheduled test results, according to embodiments presented herein.
Figure 9B:
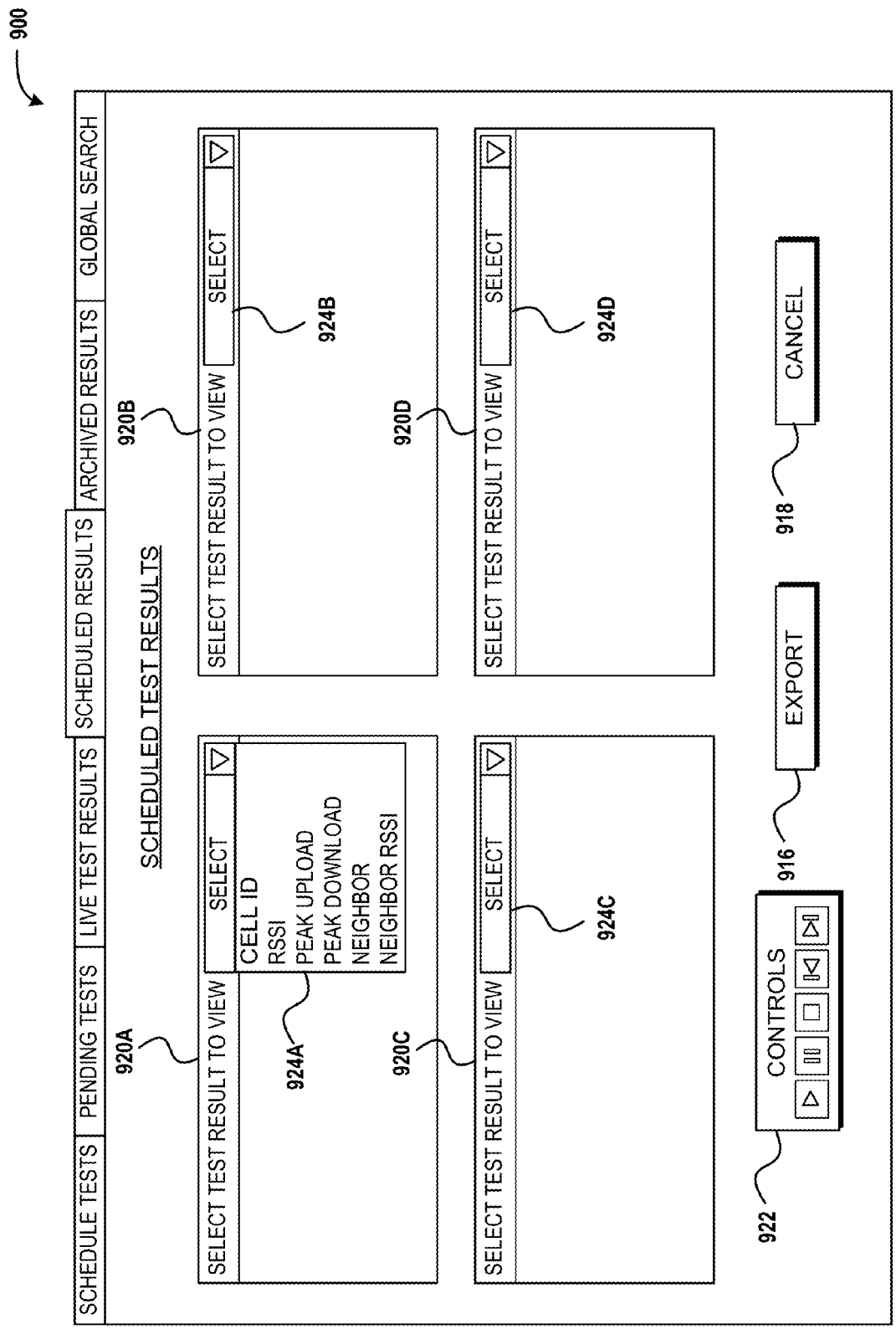
Figure 9C:
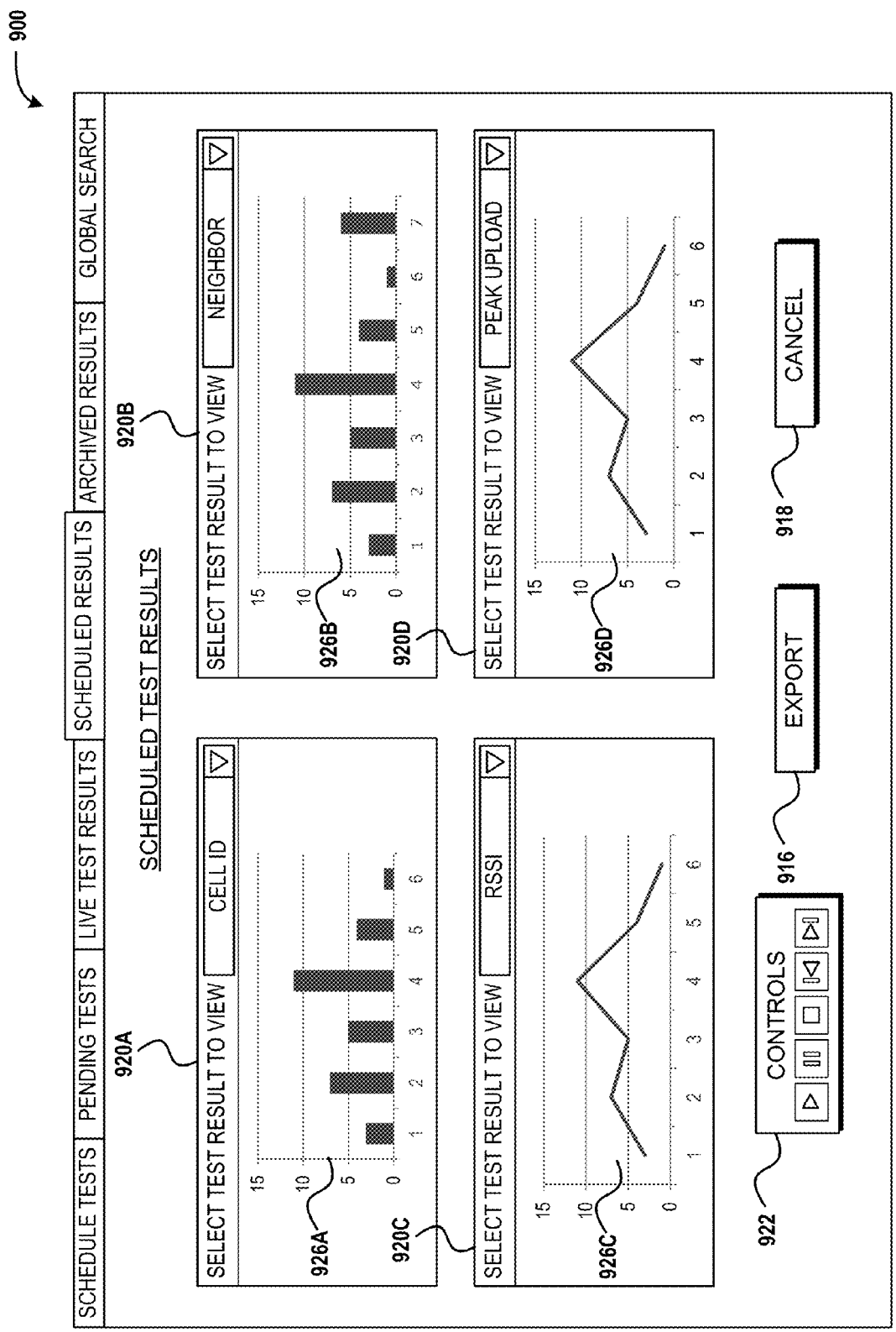

Turning now to FIGS. 9A-9C and first to FIG. 9A, a scheduled test results user interface 900 will be described, according to an illustrative embodiment. In the illustrated embodiment, the scheduled test results user interface 900 is provided as a tab dedicated to user interface features for presenting scheduled test results. The scheduled test results user interface 900, in other embodiments, is a user interface dedicated to user interface features for presenting scheduled test results. In some embodiments, the scheduled test results user interface 900 is provided on a display that is communicatively coupled to the RTC system 104. In some embodiments, the scheduled test results user interface 900 is provided to a Web server for inclusion as a Web page or as part of a Web page. In some embodiments, the RTC system 104 functions in part as the Web server. Alternatively, the RTC system 104 provides the scheduled test results user interface 900 to the Web server.

The illustrated scheduled test results user interface 900 includes a test device number column 902, a nick name column 904, a start date column 906, a start time column 908, a stop date column 910, a stop time column 912, a start button 914, an export button 916, and a cancel button 918. The test device number column 902 includes the telephone numbers of the devices that have scheduled tests associated therewith. The nick name column 904 includes the nick names of the tests. The start date column 906 includes the start dates of the tests. The start time column 908 includes the start times of the tests. The stop date column 910 includes the stop dates of the tests. The stop time column 912 includes the stop time of the tests.

Selection of the start button 914 causes the scheduled test results user interface 900 to proceed to the view shown in FIG. 9B. Selection of the export button 916 causes the scheduled test results to be exported to a document, as described in greater detail herein above. Selection of the cancel button 918 allows a user to cancel an operation.

Turning now to FIG. 9B, the illustrated scheduled test results user interface 900 includes a plurality of test result viewer interfaces 920, a controls interface 922, the export button 916, and the cancel button 918. The test result viewer interfaces 920 allow a user to select test results from a test selection menu 924. More particularly, a first test result viewer interface 920A includes a first test selection menu 924A, a second test result viewer interface 920B includes a second test result viewer interface 924B, a third test result viewer interface 920C includes a third test result viewer interface 924C, and a fourth test result viewer interface 920D includes a fourth test result viewer interface 924D. It is contemplated that more or less of test result viewer interfaces 920 may be presented within the scheduled test results user interface 900. The number of test results viewer interfaces 920 may be set by default and changed by the user. In some embodiments, the user can add or delete test results viewer interfaces 920, move the test results viewer interfaces 920 around the live test results user interface 900, and otherwise manipulate the test results viewer interfaces 902 such as expanding, shrinking, minimizing, or maximizing the test results viewer interfaces 920. Full-screen views of one or more test results viewer interfaces 920 are also contemplated.

The controls interface 922 allows a user to play test results by the selection of the play icon, pause test results by the selection of the pause icon, stop by the selection of the stop icon, rewind test results by the selection of the rewind icon, and fast forward test results by the selection of the fast forward icon. It should be understood that the fast forward icon may only be available if the current view of the test results is at a time before a present time during which the live results are being presented. Selection of the cancel button 918 allows a user to clear a selection, cancel a current operation, revert to a previous user interface, or some other functionality to cancel a previous operation.

Turning now to FIG. 9C, the scheduled test results user interface 900 includes the plurality of test result viewer interfaces 920, the controls interface 922, the export button 916, and the cancel button 918. The test result viewer interfaces 920 in FIG. 9C each include a graphical representation 926 of the selected test results. More particularly, the first test result viewer interface 920A includes a first graphical representation 926A of cell ID test results, the second test result viewer interface 920B includes a second graphical representation 926B of neighbor cell test results, the third test result viewer interface 920C includes a third graphical representation 926C of RSSI test results, and the fourth test result viewer interface 920D includes a fourth graphical representation 926D of peak upload test results. Although specific test results are shown, these should not be interpreted as being limiting in any way, nor should the type of graphical representations shown.

The controls interface 922 allows a user to play test results by the selection of the play icon, pause test results by the selection of the pause icon, stop by the selection of the stop icon, rewind test results by the selection of the rewind icon, and fast forward test results by the selection of the fast forward icon. Selection of the cancel button 918 allows a user to clear a selection, cancel a current operation, revert to a previous user interface, or some other functionality to cancel a previous operation.

Figure 10A:
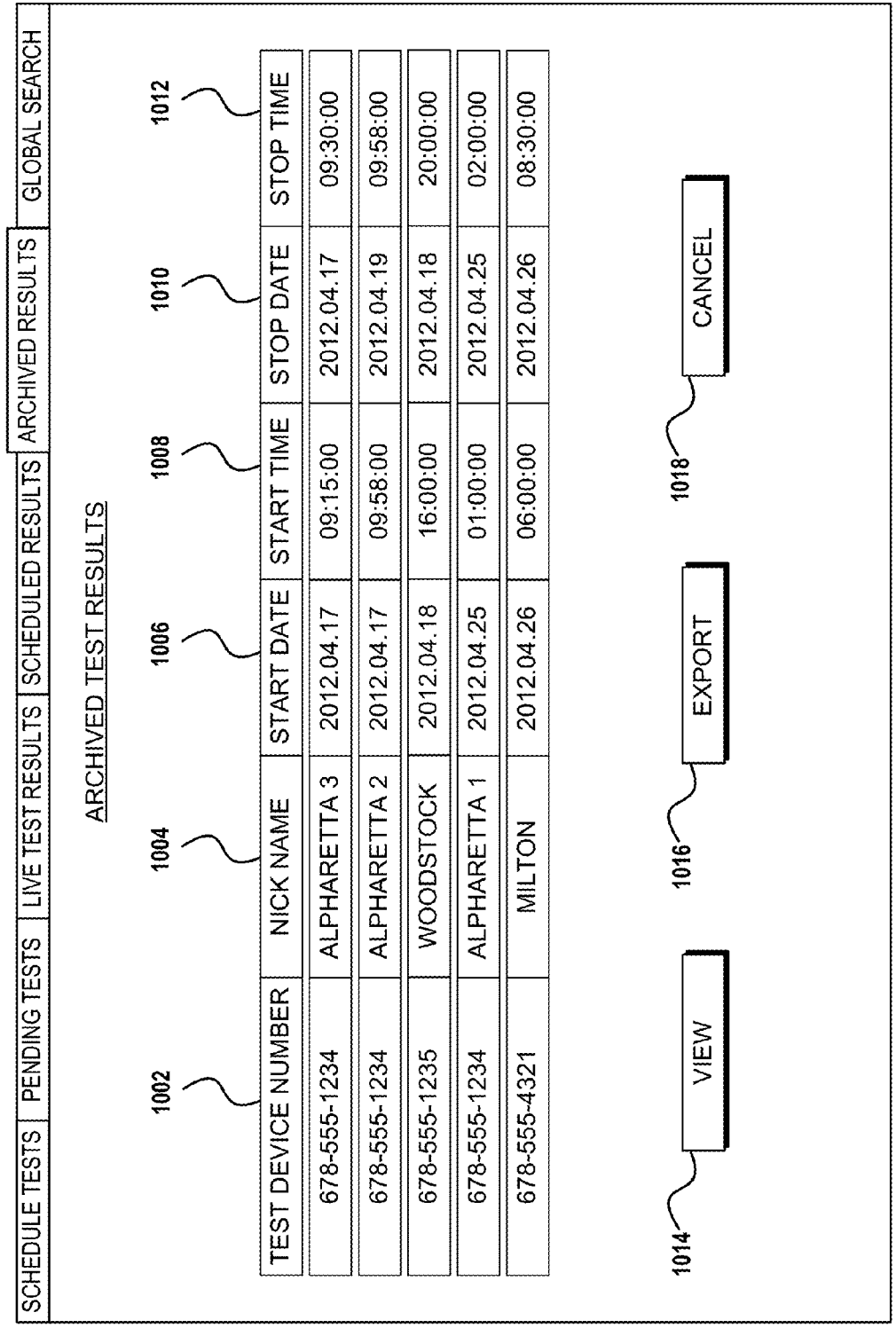
FIGS. 10A-10C are user interface diagrams illustrating an illustrative user interface for presenting archived test results, according to embodiments presented herein.
Figure 10B:
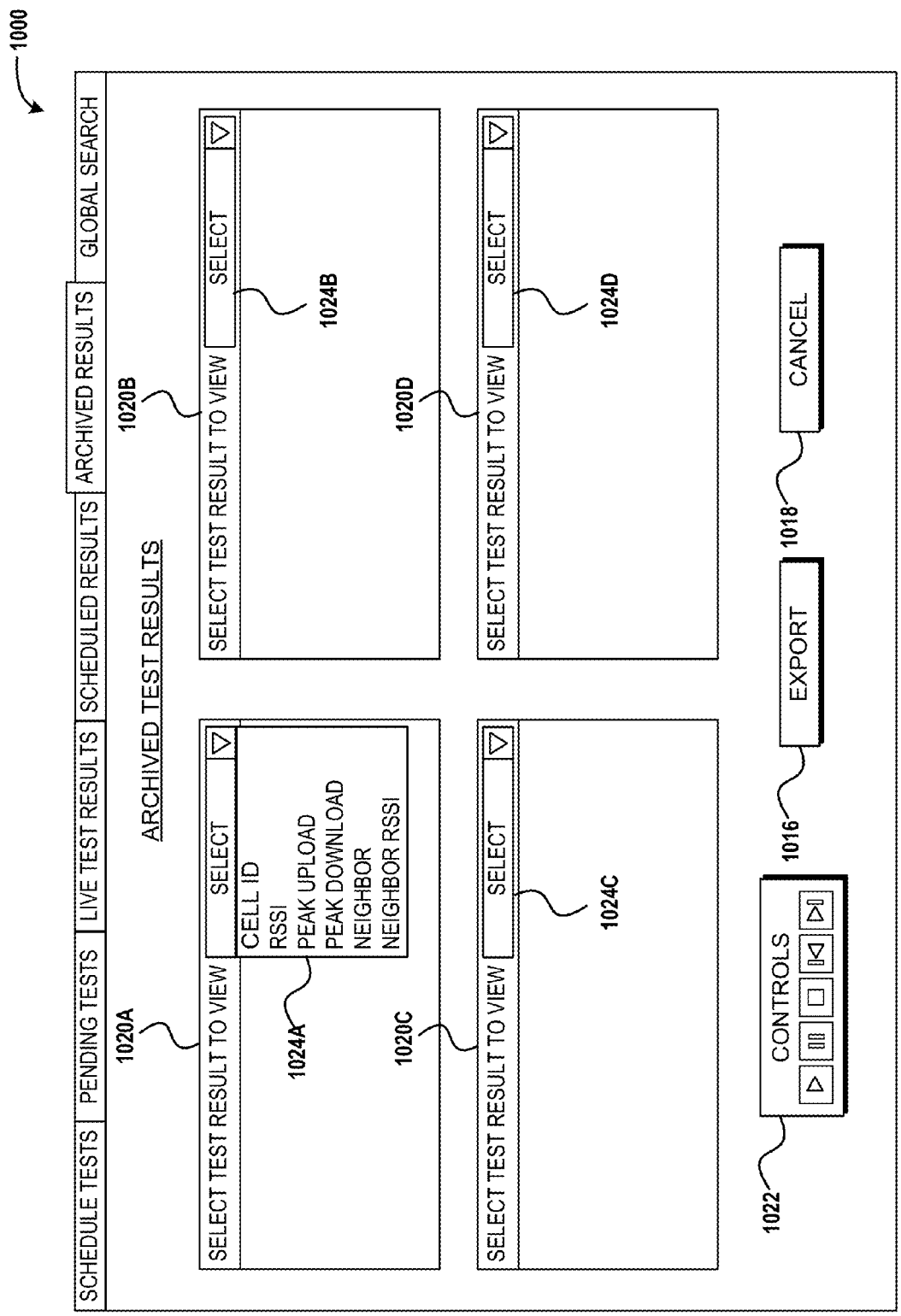
Figure 10C:
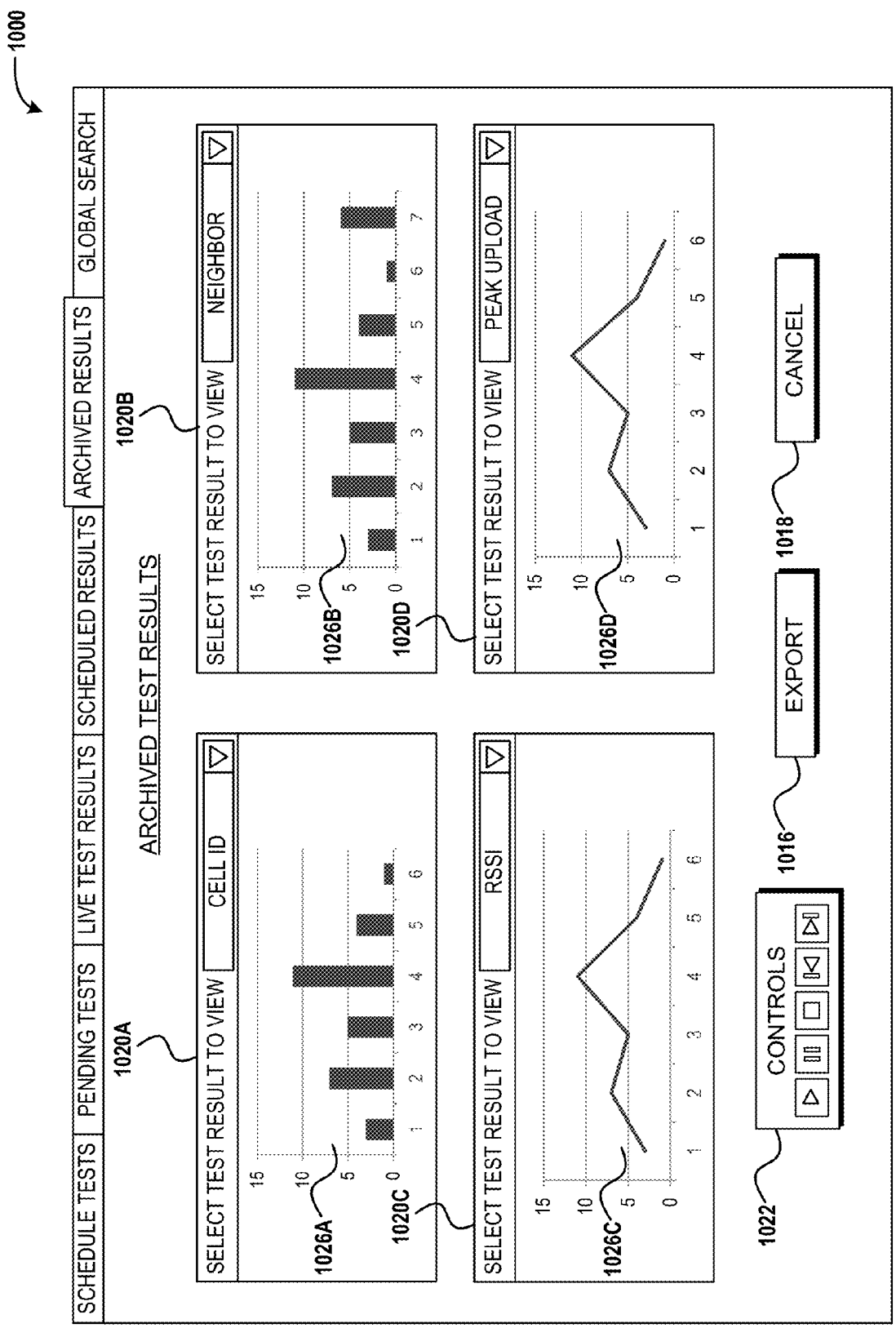

Turning now to FIGS. 10A-10C and first to FIG. 10A, an archived test results user interface 1000 will be described, according to an illustrative embodiment. In the illustrated embodiment, the archived test results user interface 1000 is provided as a tab dedicated to user interface features for presenting archived test results. The archived test results user interface 1000, in other embodiments, is a user interface dedicated to user interface features for presenting archived test results. In some embodiments, the archived test results user interface 1000 is provided on a display that is communicatively coupled to the RTC system 104. In some embodiments, the archived test results user interface 1000 is provided to a Web server for inclusion as a Web page or as part of a Web page. In some embodiments, the RTC system 104 functions in part as the Web server. Alternatively, the RTC system 104 provides the archived test results user interface 1000 to the Web server.

The illustrated archived test results user interface 1000 includes a test device number column 1002, a nick name column 1004, a start date column 1006, a start time column 1008, a stop date column 1010, a stop time column 1012, a view button 1014, an export button 1016, and a cancel button 1018. The test device number column 1002 includes the telephone numbers of the devices that have archived tests associated therewith. The nick name column 1004 includes the nick names of the tests. The start date column 1006 includes the start dates of the tests. The start time column 1008 includes the start times of the tests. The stop date column 1010 includes the stop dates of the tests. The stop time column 1012 includes the stop time of the tests.

Selection of the view button 1014 causes the archived test results user interface 1000 to proceed to the view shown in FIG. 10B. Selection of the export button 1016 causes the archived test results to be exported to a document, as described in greater detail herein above. Selection of the cancel button 1018 allows a user to cancel an operation.

Turning now to FIG. 10B, the illustrated archived test results user interface 1000 includes a plurality of test result viewer interfaces 1020, a controls interface 1022, the export button 1016, and the cancel button 1018. The test result viewer interfaces 1020 allow a user to select test results from a test selection menu 1024. More particularly, a first test result viewer interface 1020A includes a first test selection menu 1024A, a second test result viewer interface 1020B includes a second test result viewer interface 1024B, a third test result viewer interface 1020C includes a third test result viewer interface 1024C, and a fourth test result viewer interface 1020D includes a fourth test result viewer interface 1024D. It is contemplated that more or less of test result viewer interfaces 1020 may be presented within the archived test results user interface 1000. The number of test results viewer interfaces 1020 may be set by default and changed by the user. In some embodiments, the user can add or delete test results viewer interfaces 1020, move the test results viewer interfaces 1020 around the archived test results user interface 1000, and otherwise manipulate the test results viewer interfaces 1020 such as expanding, shrinking, minimizing, or maximizing the test results viewer interfaces 1020. Full-screen views of one or more test results viewer interfaces 1020 are also contemplated.

The controls interface 1022 allows a user to play test results by the selection of the play icon, pause test results by the selection of the pause icon, stop by the selection of the stop icon, rewind test results by the selection of the rewind icon, and fast forward test results by the selection of the fast forward icon. Selection of the cancel button 1018 allows a user to clear a selection, cancel a current operation, revert to a previous user interface, or some other functionality to cancel a previous operation.

Turning now to FIG. 10C, the archived test results user interface 1000 includes the plurality of test result viewer interfaces 1020, the controls interface 1022, the export button 1016, and the cancel button 1018. The test result viewer interfaces 1020 in FIG. 10C each include a graphical representation 1026 of the selected test results. More particularly, the first test result viewer interface 1020A includes a first graphical representation 1026A of cell ID test results, the second test result viewer interface 1020B includes a second graphical representation 1026B of neighbor cell test results, the third test result viewer interface 1020C includes a third graphical representation 1026C of RSSI test results, and the fourth test result viewer interface 1020D includes a fourth graphical representation 1026D of peak upload test results. Although specific test results are shown, these should not be interpreted as being limiting in any way, nor should the type of graphical representations shown.

The controls interface 1022 allows a user to play test results by the selection of the play icon, pause test results by the selection of the pause icon, stop by the selection of the stop icon, rewind test results by the selection of the rewind icon, and fast forward test results by the selection of the fast forward icon. Selection of the cancel button 1018 allows a user to clear a selection, cancel a current operation, revert to a previous user interface, or some other functionality to cancel a previous operation.

Figure 11A:
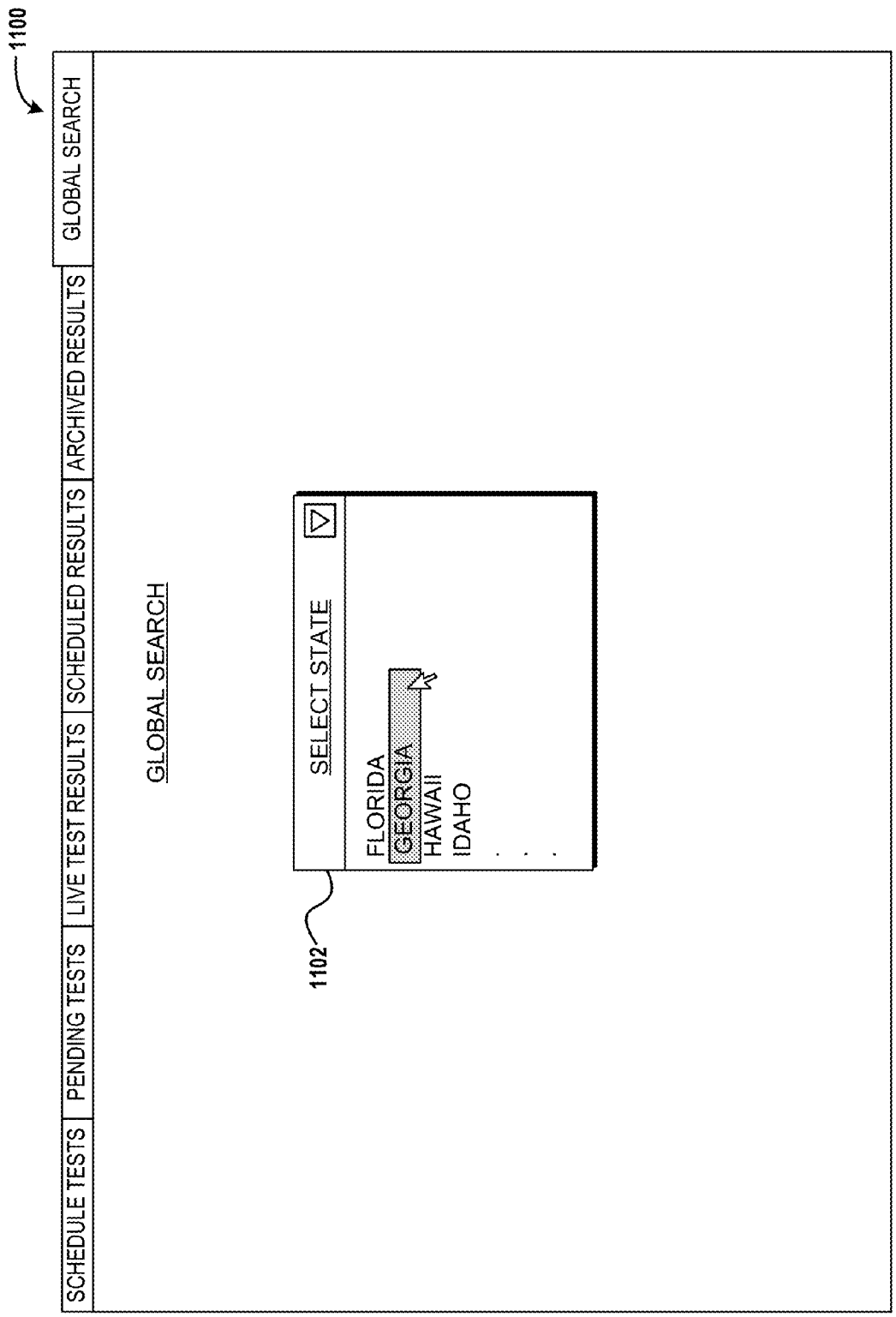
FIGS. 11A-11G are user interface diagrams illustrating an illustrative user interface for providing a global search for test results, according to embodiments presented herein.

Turning now to FIGS. 11A-11G and first to FIG. 11A, a global search user interface 1100 will be described, according to an illustrative embodiment. In the illustrated embodiment, the global search user interface 1100 is provided as a tab dedicated to user interface features searching for test results. The global search user interface 1100, in other embodiments, is a user interface dedicated to user interface features for searching for test results. In some embodiments, the global search user interface 1100 is provided on a display that is communicatively coupled to the RTC system 104. In some embodiments, the global search user interface 1100 is provided to a Web server for inclusion as a Web page or as part of a Web page. In some embodiments, the RTC system 104 functions in part as the Web server. Alternatively, the RTC system 104 provides the global search user interface 1100 to the Web server.

The illustrated global search user interface 1100 includes a location selection menu 1102. The location selection menu 1102 allows a user to select a location in which the user desires to search for test results. In the illustrated embodiment, the location selection menu 1102 is a drop-down menu that provides the available states in which to search for test results of one or more tests, with the state of "Georgia" having been selected. It should be understood that the location selection menu 1102 alternatively may contain more or less granular location selection. Moreover, although the illustrated location selection menu 1102 is a drop-down menu, another type of menu system, prompt, or field may be used to acquire a location in which the user desires to search for test results of one or more tests. In some embodiments, additional menus, other prompts, or fields are added to facilitate a more or less granular location selection. For instance, another drop-down menu may be added to include the selection of a particular city within a selected state. The illustrated embodiment shows the selection of a location from the location selection menu 1102 via a mouse cursor. Selection of a location may occur through other mechanisms including, but not limited to, voice, single touch, multi-touch, touch gestures, keyboard, joystick, or some combination thereof.

Figure 11B:
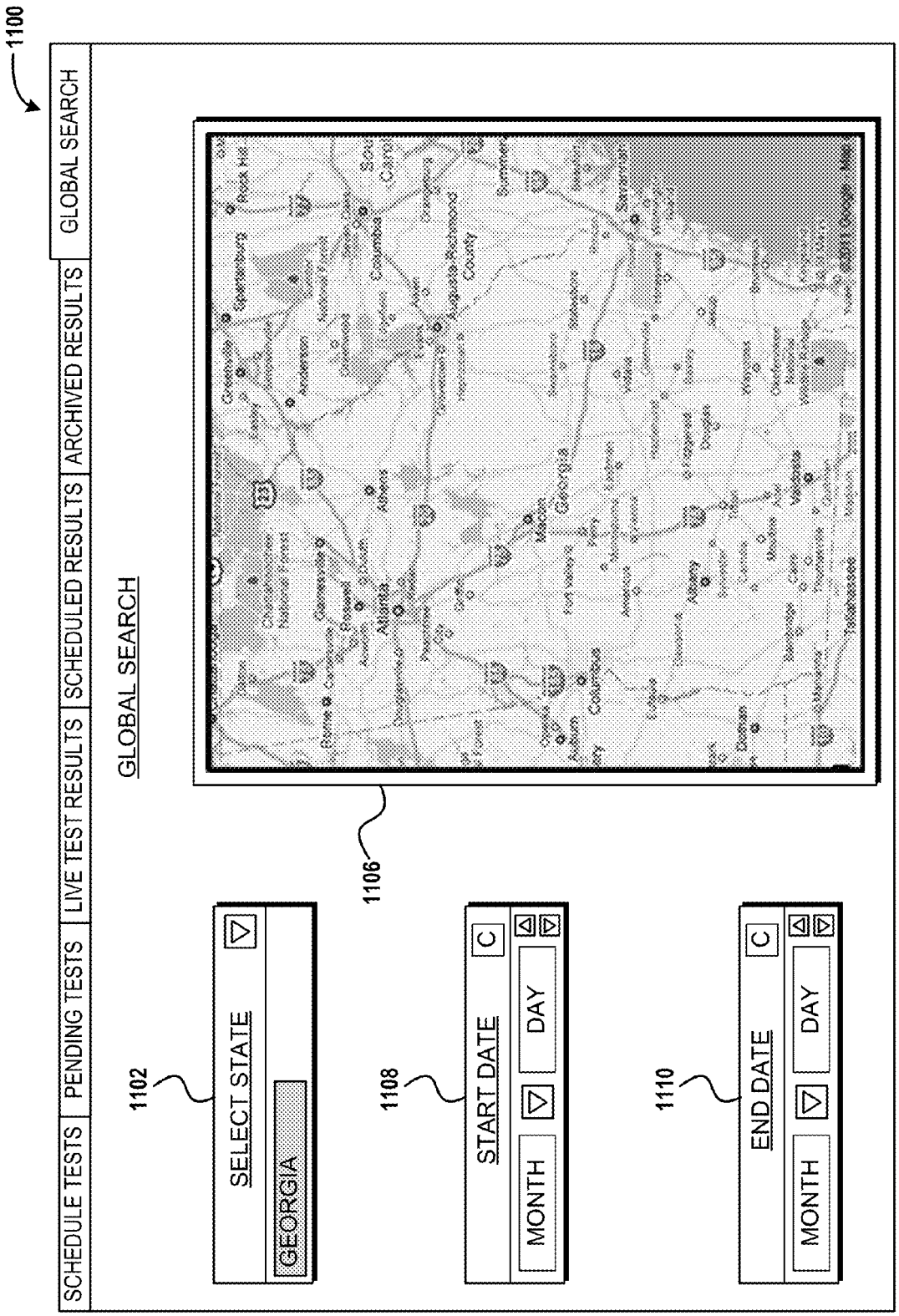

Turning now to FIG. 11B, the illustrated global search user interface includes the location selection menu 1102, a map interface 1106 that shows the selected location, which, in the illustrated embodiment, is the state of "Georgia," a start date selection menu 1108, and an end date selection menu 1110. The start date selection menu 1108 allows a user to select a start date and the stop date selection menu 1110 allows the user to select the end date for a date range within which to search for test results of one or more tests.

Figure 11C:
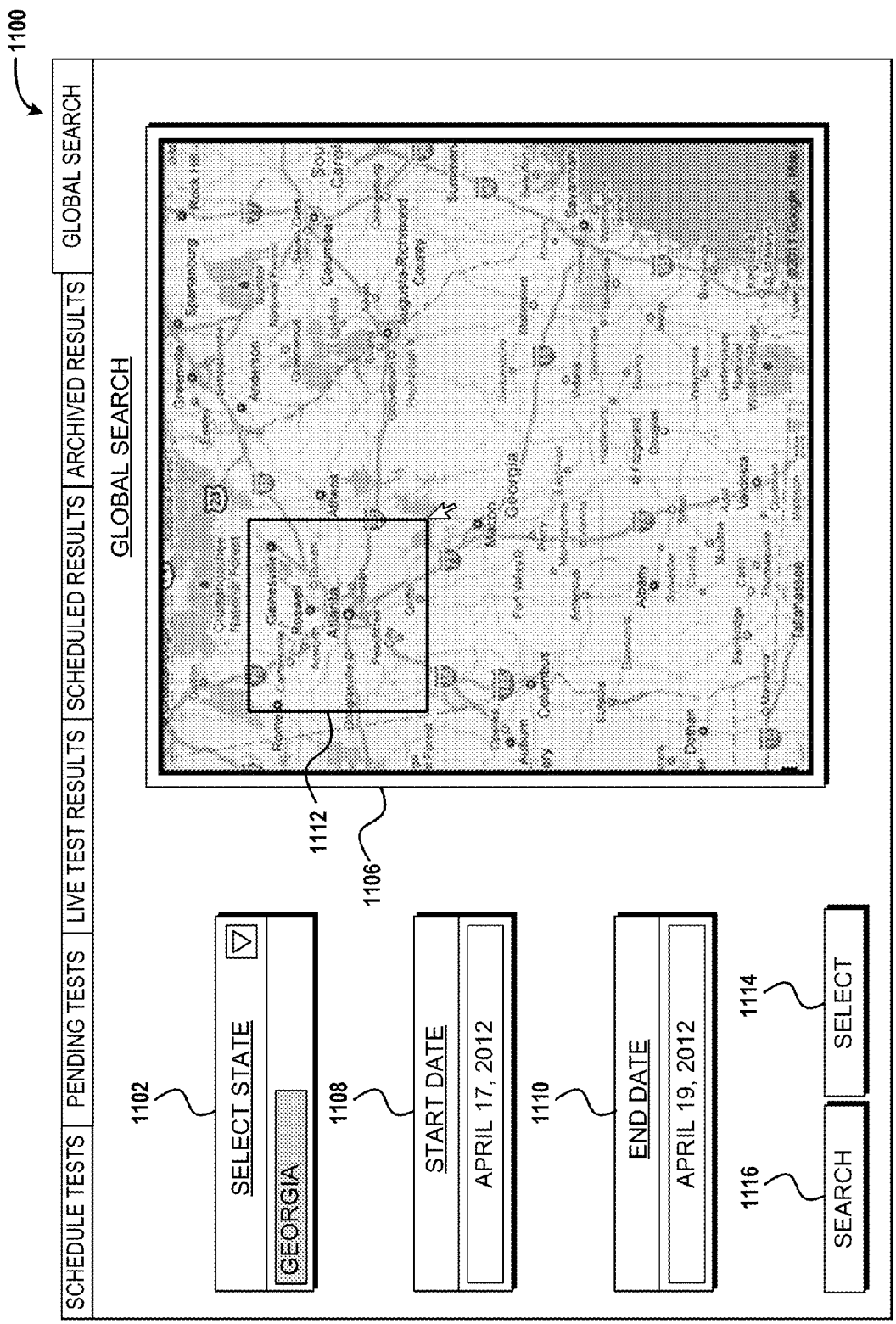

Turning now to FIG. 11C, the illustrated global search user interface 1100 includes the location selection menu 1102, the map interface 1106 that shows the selected location, which, in the illustrated embodiment, is the state of "Georgia," the start date selection menu 1108, which, in the illustrated embodiment, shows "Apr. 17, 2012," and the end date selection menu 1110, which, in the illustrated embodiment, shows "Apr. 19, 2012." The illustrated global search user interface 1100 also includes a selected area 1112, which a user has selected to fine-tune the location within which to search for test results of one or more tests. Selection of a select button 1114 provides a user with control to select the selected area 1112 or another area within the map interface 1106 within which to search for test results for one or more tests. Selection of a search button 1116 initiates the search based upon the parameters input in FIGS. 11A and 11B.

Figure 11D:
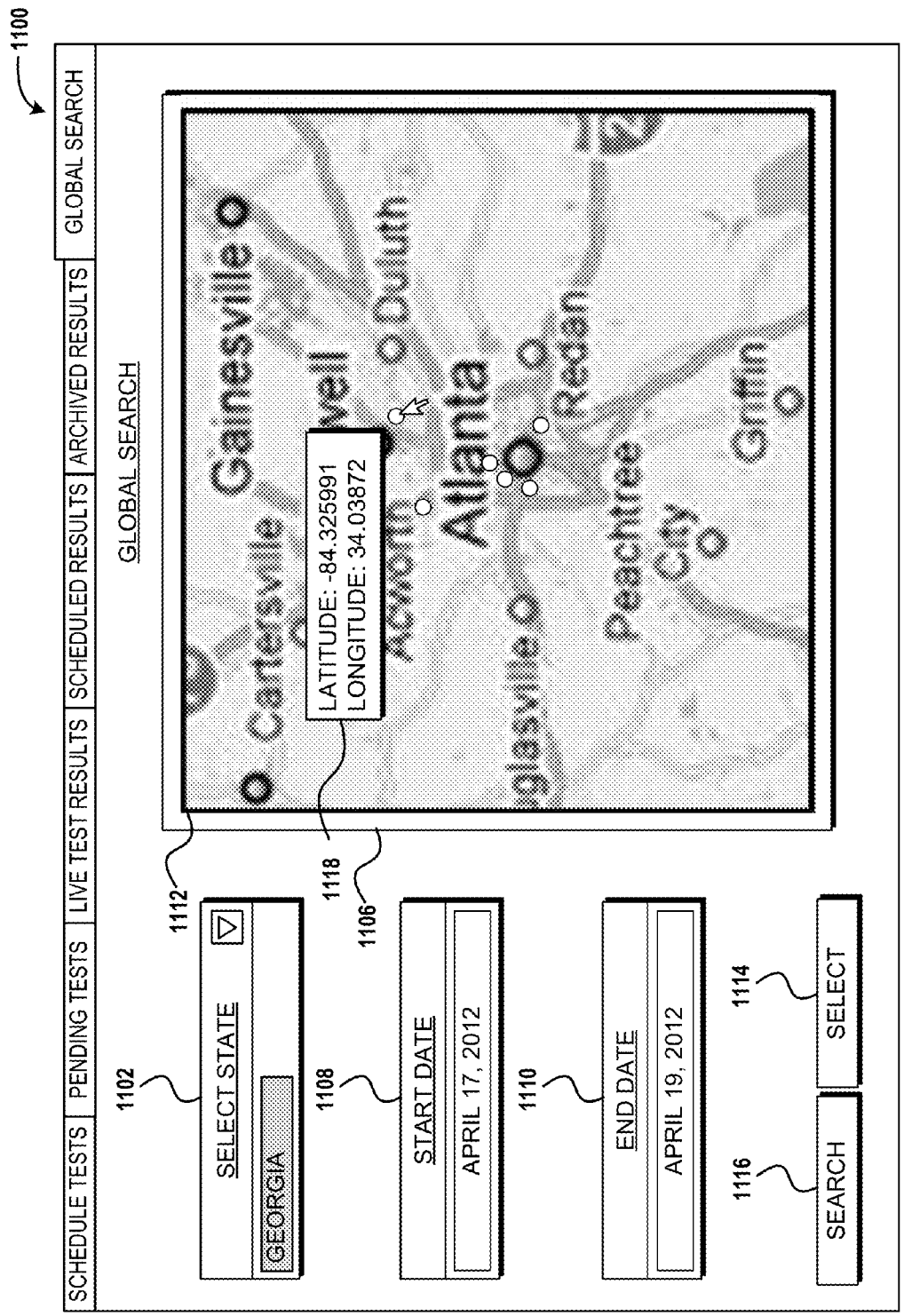

Turning now to FIG. 11D, the illustrated global search user interface 1100 includes the elements described above with regard to FIG. 11C. The illustrated map interface 1106 shows the selected area 1112, a plurality of mobile devices within the selected area 1112 (illustrated as white circles), and an information overlay 1118 that provides location information for a selected one of the mobile devices.

Figure 11E:
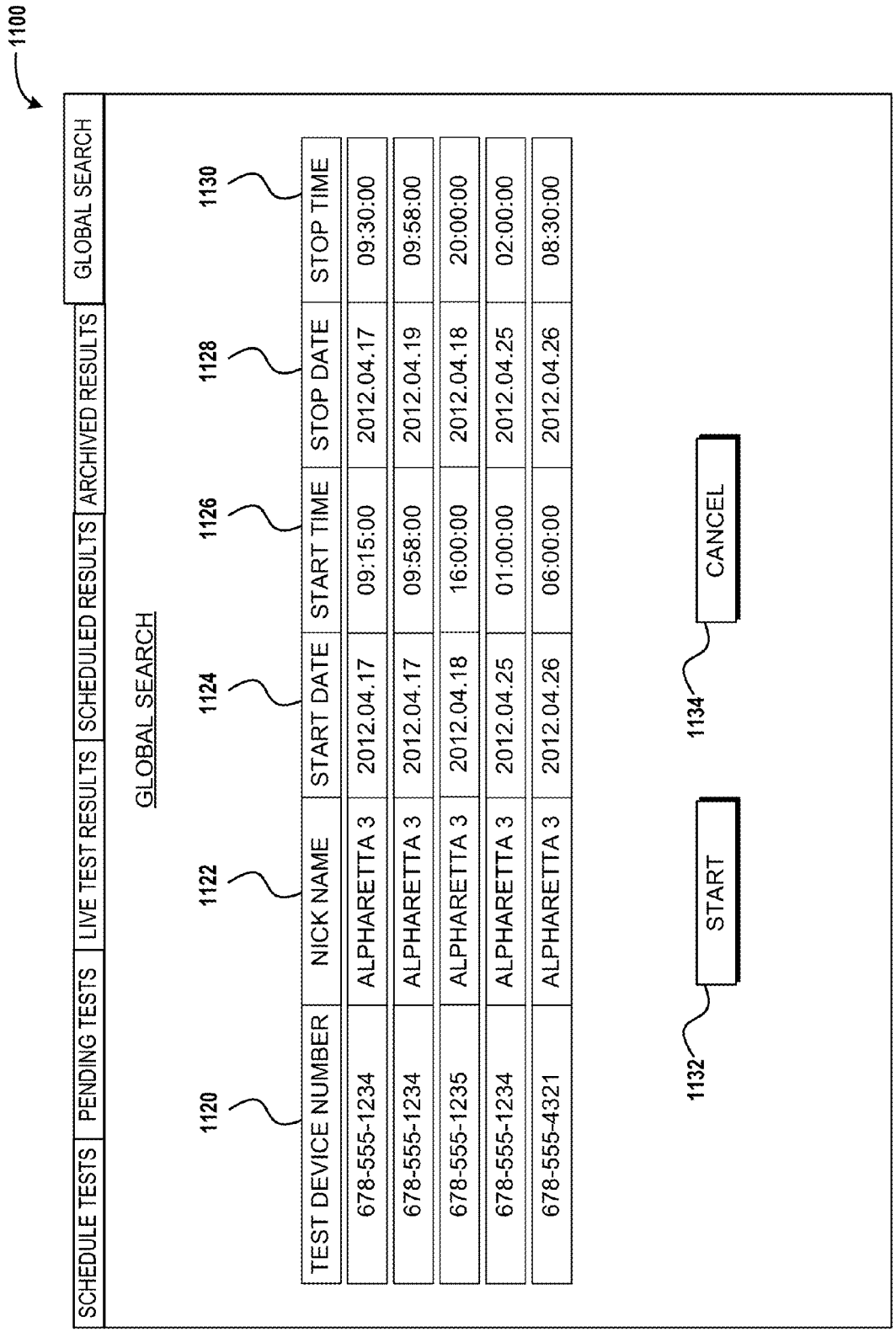

Turning now to FIG. 11E, the illustrated global search user interface 1100 includes a test device number column 1120, a nick name column 1122, a start date column 1124, a start time column 1126, a stop date column 1128, a stop time column 1130, a start button 1132, and a cancel button 1134. The test device number column 1120 includes the telephone numbers of the devices that are associated with tests provided by the search. The nick name column 1122 includes the nick names of the tests. The start date column 1124 includes the start dates of the tests. The start time column 1126 includes the start times of the tests. The stop date column 1128 includes the stop dates of the tests. The stop time column 1130 includes the stop time of the tests.

Figure 11F:
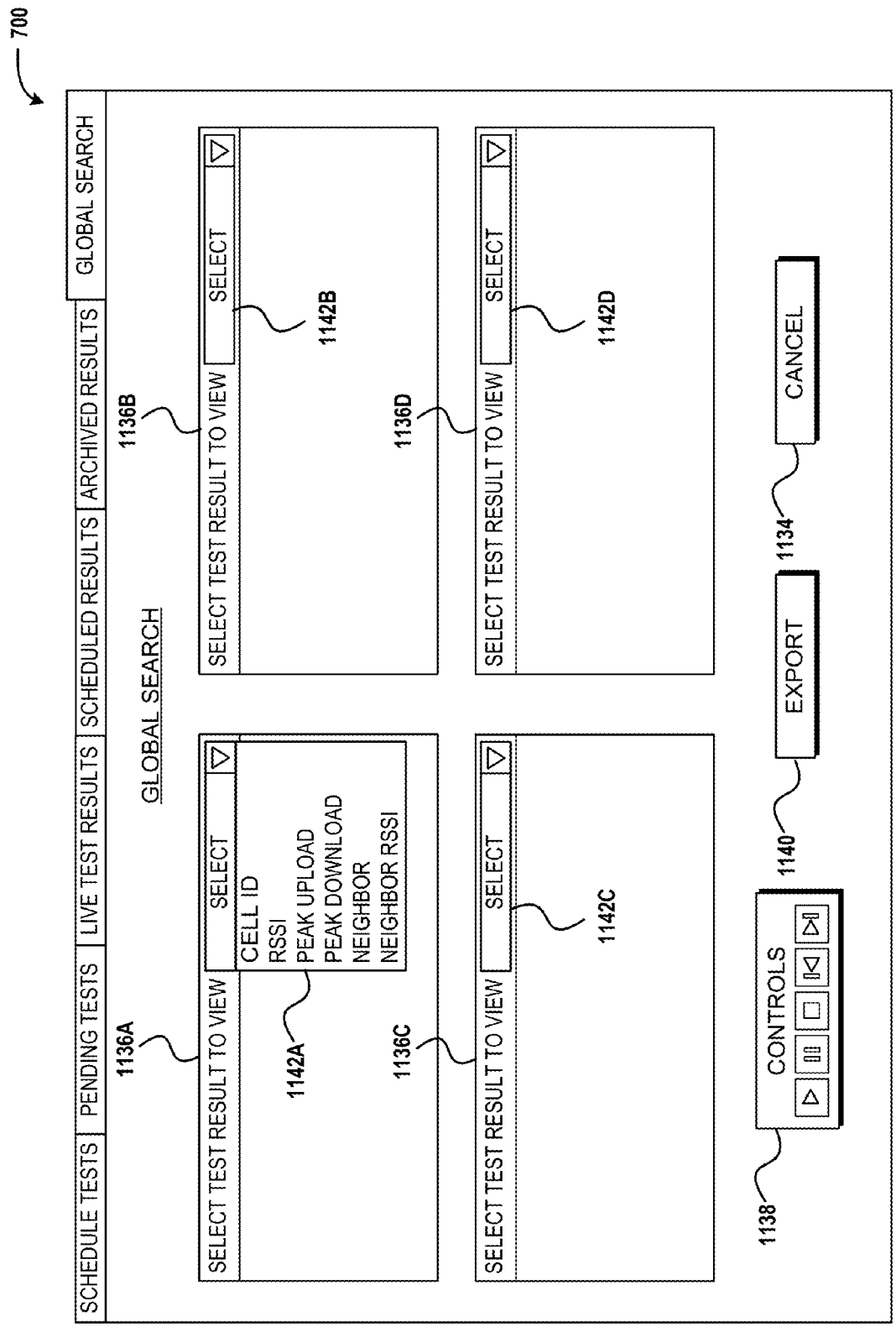

Selection of the start button 1132 causes the global search interface 1100 to proceed to the view shown in FIG. 11F. Selection of the cancel button 1134 allows a user to cancel an operation.

Turning now to FIG. 11F, the illustrated global search user interface 1100 includes a plurality of test result viewer interfaces 1136, a controls interface 1138, the export button 1140, and the cancel button 1134. The test result viewer interfaces 1136 allow a user to select test results from a test selection menu 1142. More particularly, a first test result viewer interface 1136A includes a first test selection menu 1142A, a second test result viewer interface 1136B includes a second test result viewer interface 1142B, a third test result viewer interface 1136C includes a third test result viewer interface 1142C, and a fourth test result viewer interface 1136D includes a fourth test result viewer interface 1142D. It is contemplated that more or less of test result viewer interfaces 1136 may be presented within the global search user interface 1100. The number of test results viewer interfaces 1136 may be set by default and changed by the user. In some embodiments, the user can add or delete test results viewer interfaces 1136, move the test results viewer interfaces 1136 around the global search user interface 1100, and otherwise manipulate the test results viewer interfaces 1136 such as expanding, shrinking, minimizing, or maximizing the test results viewer interfaces 1136. Full-screen views of one or more test results viewer interfaces 1136 are also contemplated.

The controls interface 1138 allows a user to play test results by the selection of the play icon, pause test results by the selection of the pause icon, stop by the selection of the stop icon, rewind test results by the selection of the rewind icon, and fast forward test results by the selection of the fast forward icon. Selection of the export button 1140 causes the presented test results to be exported 1140 to a document, such as described in greater detail above. Since not test results are shown in FIG. 11F, the export button 1140 may be grayed out. Selection of the cancel button 1134 allows a user to clear a selection, cancel a current operation, revert to a previous user interface, or some other functionality to cancel a previous operation.

Figure 11G:
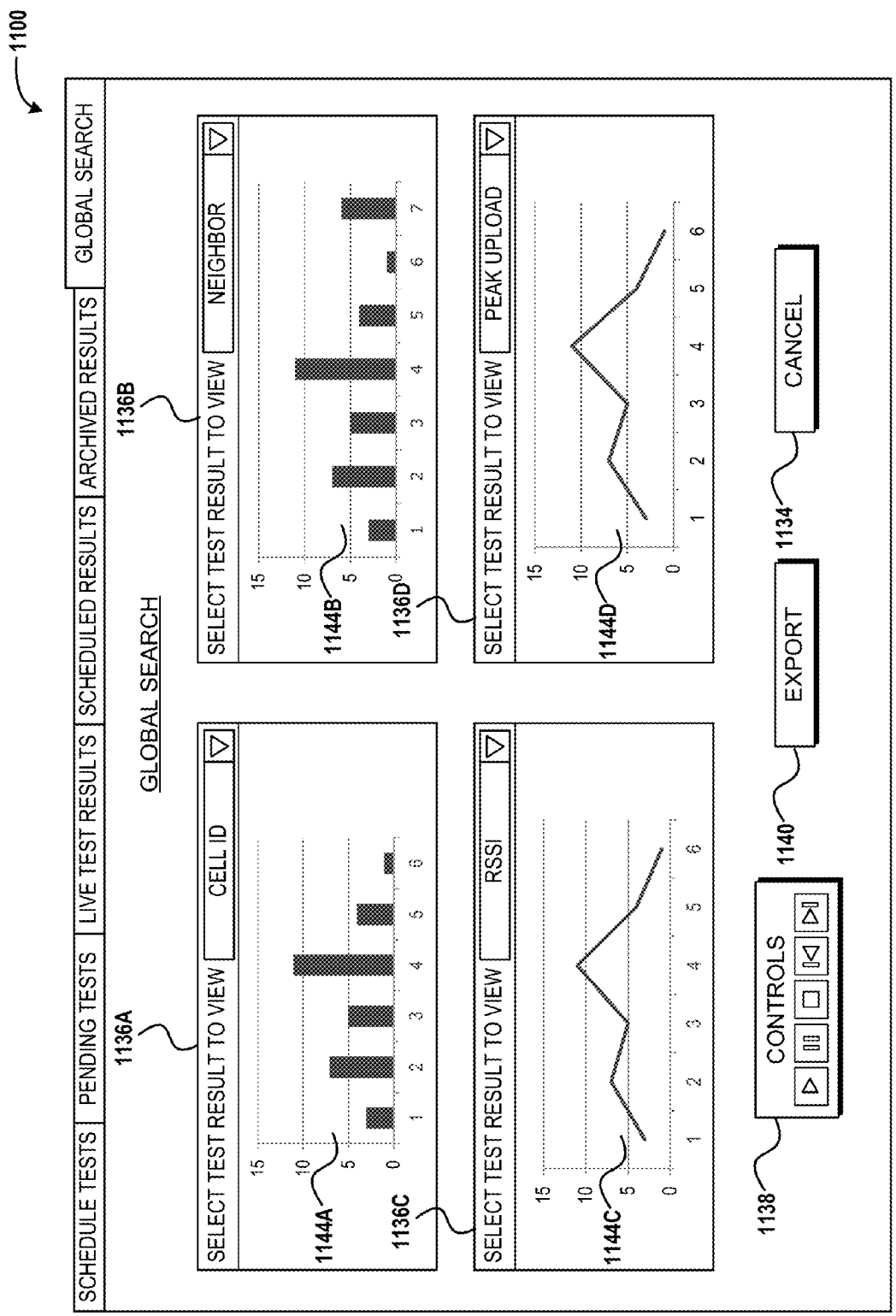

Turning now to FIG. 11G, the global search user interface 1100 includes the plurality of test result viewer interfaces 1136, the controls interface 1138, the export button 1140, and the cancel button 1134. The test result viewer interfaces 1136 in FIG. 11G each include a graphical representation 1144 of the selected test results. More particularly, the first test result viewer interface 1136A includes a first graphical representation 1144A of cell ID test results, the second test result viewer interface 1136B includes a second graphical representation 1144B of neighbor cell test results, the third test result viewer interface 1136C includes a third graphical representation 1144C of RSSI test results, and the fourth test result viewer interface 1136D includes a fourth graphical representation 1144D of peak upload test results. Although specific test results are shown, these should not be interpreted as being limiting in any way, nor should the type of graphical representations shown.

The controls interface 1138 allows a user to play test results by the selection of the play icon, pause test results by the selection of the pause icon, stop by the selection of the stop icon, rewind test results by the selection of the rewind icon, and fast forward test results by the selection of the fast forward icon. Selection of the export button 1140 causes the presented test results to be exported 1140 to a document, such as described in greater detail above. Selection of the cancel button 1134 allows a user to clear a selection, cancel a current operation, revert to a previous user interface, or some other functionality to cancel a previous operation.

Figure 12:
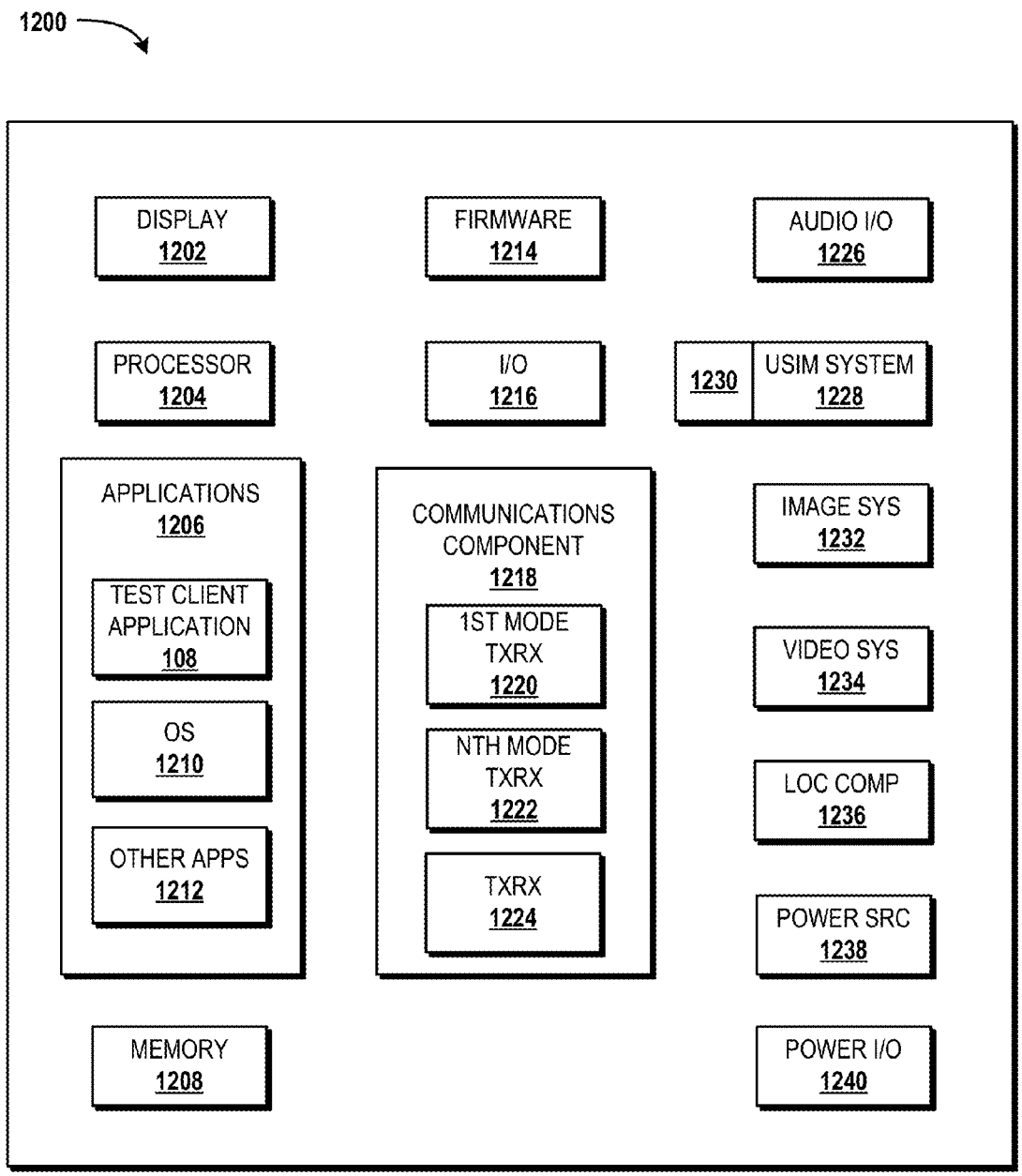
FIG. 12 is a mobile device architecture diagram illustrating an illustrative mobile device hardware and software architecture for a mobile device capable of implementing aspects of the embodiments disclosed herein.

Turning now to FIG. 12, an illustrative mobile device 1200 and components thereof will be described. Although connections are not shown between the components illustrated in FIG. 12, the components can interact with each other to carry out device functions. In some embodiments, for example, the components are arranged so as to communicate via one or more busses (not shown). It should be understood that FIG. 12 and the following description are intended to provide a general understanding of a suitable environment in which various aspects of embodiments can be implemented. The mobile devices 102 described herein above may be configured like the mobile device 1200. It should be understood that the mobile device may include additional functionality or include less functionality than now described.

As illustrated in FIG. 12, the mobile device 1200 includes a display 1202 for visually displaying data including, but not limited to, GUI elements, text, images, video, virtual keypads and/or keyboards, messaging data, notification messages, metadata, internet content, device status, time, date, calendar data, device preferences, map and location data, and the like. The mobile device 1200 also includes a processor 1204 for processing data and/or executing computer-executable instructions of one or more applications 1206 stored in a memory 1208.

In the illustrated embodiment, the applications 1206 include the test client application 108, an operating system ("OS") application 1210, and other applications 1212. In some embodiments, the OS application 1210 is one of SYMBIAN OS from SYMBIAN LIMITED, WINDOWS MOBILE OS from MICROSOFT CORPORATION, WINDOWS PHONE OS from MICROSOFT CORPORATION, PALM WEBOS from HEWLETT PACKARD CORPORATION, BLACKBERRY OS from RESEARCH IN MOTION LIMITED, IOS from APPLE INC., and ANDROID OS from GOOGLE INC. These operating systems are merely illustrative of the operating systems that may be used in accordance with the embodiments disclosed herein.

In some embodiments, the other applications 1212 include, for example, visual voicemail applications, messaging applications, text-to-speech and speech-to-text applications, add-ons, plug-ins, email applications, music applications, video applications, camera applications, location-based service applications, navigation applications, power conservation applications, game applications, productivity applications, entertainment applications, enterprise applications, combinations thereof, and the like. The applications 1206 or portions thereof are stored in the memory 1208 and/or in a firmware 1214, and are executed by the processor 1204. The firmware 1214 may also store code for execution during device power up and power down operations. In some embodiments, the OS 1210 or a portion thereof, such as a kernel, is stored in the firmware 1214.

The mobile device 1200 also includes an input/output ("I/O") interface 1216 for the input/output of data such as location information, presence status information, user IDs, passwords, application initiation (start-up) requests, and other input/output of data associated with the embodiments disclosed herein. In some embodiments, the I/O interface 1216 is a hardwire connection such as a universal serial bus ("USB"), mini-USB, micro-USB, audio jack, PS2, IEEE 1394, serial, parallel, Ethernet (RJ411) port, RJ11 port, proprietary port, combinations thereof, or the like. In some embodiments, the mobile device 1200 is configured to synchronize with another device (e.g., a computer) to transfer content stored to/from the mobile device 1200. In some embodiments, the mobile device 1200 is configured to receive updates to one or more of the applications 1206 via the I/O interface 1216. In some embodiments, the I/O interface 1216 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 1216 may be used for communications between the mobile device 1200 and a network device or local device instead of, or in addition to, a communications component 1218.

The communications component 1218 interfaces with the processor 1204 to facilitate wireless communications with one or more networks. In some embodiments, the one or more networks include networks that utilize a mobile wireless technology. In some embodiments, one or more networks include networks that utilize non-cellular wireless technologies such as WI-FI or WIMAX. In some embodiments, the communications component 1218 includes a multimode communications subsystem for facilitating communications via a cellular network and one or more WI-FI, WIMAX or other non-cellular wireless network.

The communications component 1218, in some embodiments, includes one or more transceivers each configured to communicate over the same or a different wireless technology standard. For example, the transceivers of the communications component 1218 may be configured to communicate using GSM, CDMAONE, CDMA2000, LTE, and various other 2G, 2.5G, 3G, 4G, and greater generation technology standards. Moreover, the communications component 1218 may facilitate communications over various channel access methods (which may or may not be used by the aforementioned standards) including, but not limited to, TDMA, FDMA, W-CDMA, OFDM, SDMA, and the like. In addition, the communications component 1218 may facilitate data communications using GPRS, EDGE, the HSPA protocol family including HSDPA, EUL or otherwise termed HSUPA, HSPA+, and various other current and future wireless data access standards.

In the illustrated embodiment, the communications component 1218 includes a first cellular transceiver 1220 that operates in one mode (e.g., GSM), and an $N^{th}$ cellular transceiver 1222 operates in a different mode (e.g., UMTS). While only two cellular transceivers 1220, 1222 are illustrated, it should be appreciated that more than two transceivers can be included in the communications component 1218.

The illustrated communications component 1218 also includes an alternative communications transceiver 1224 for use by other communications technologies including WI-FI, WIMAX, BLUETOOTH, infrared, infrared data association ("IRDA"), near field communications ("NFC"), other RF, combinations thereof, and the like. In some embodiments, the communications component 1218 also facilitates reception from terrestrial radio networks, digital satellite radio networks, internet-based radio service networks, combinations thereof, and the like.

The communications component 1218 processes data from a network such as an internet, the Internet, an intranet, a home broadband network, a WI-FI hotspot, and the like, via an internet service provider ("ISP"), digital subscriber line ("DSL") provider, or broadband provider.

Audio capabilities for the mobile device 1200 may be provided by an audio I/O component 1226 that includes a speaker for the output of audio signals and a microphone to collect audio signals.

The illustrated mobile device 1200 also includes a universal subscriber identity module ("USIM") system 1228 that includes a SIM slot interface 1230 for accommodating a USIM card. In some embodiments, the USIM system 1228 is configured to accept insertion of other SIM cards for access to other network types such as GSM. In other embodiments, the USIM system 1228 is configured to accept multiple SIM cards. In still other embodiments, the USIM system 1228 is configured to accept a universal integrated circuit card ("UICC") with one or more SIM applications stored thereupon.

The mobile device 1200 may also include an image capture and processing system 1232 ("image system"). Photos may be obtained via an associated image capture subsystem of the image system 1232, for example, a camera. The mobile device 1200 may also include a video system 1234 for capturing, processing, recording, and/or modifying video content. Photos and videos obtained using the image system 1232 and the video system 1234, respectively, may be added as message content to a MMS message and sent to another mobile device.

The illustrated mobile device 1200 also includes a location component 1236 for sending and/or receiving signals such as global positioning system ("GPS") data, assisted-GPS data, WI-FI/WIMAX and/or cellular network triangulation data, combinations thereof, and the like, for determining a location of the mobile device 1200. The location component 1236 may communicate with the communications component 1218 to retrieve triangulation data for determining a location of the mobile device 1200. In some embodiments, the location component 1236 interfaces with cellular network nodes, telephone lines, satellites, location transmitters and/or beacons, wireless network transmitters and receivers, combinations thereof, and the like. In some embodiments, the location component 1236 includes one or more sensors such as a compass, an accelerometer, and/or a gyroscope to determine the orientation of the mobile device 1200. Using the location component 1236, the mobile device 1200 can generate and/or receive data to identify its location, or transmit data used by other devices to determine the location of the mobile device 1200. The location component 1236 may include multiple components for determining the location and/or orientation of the mobile device 1200.

The illustrated mobile device 1200 also includes a power source 1238, such as one or more batteries and/or other power subsystem (AC or DC). The power source 1238 may interface with an external power system or charging equipment via a power I/O component 1240.

Figure 13:
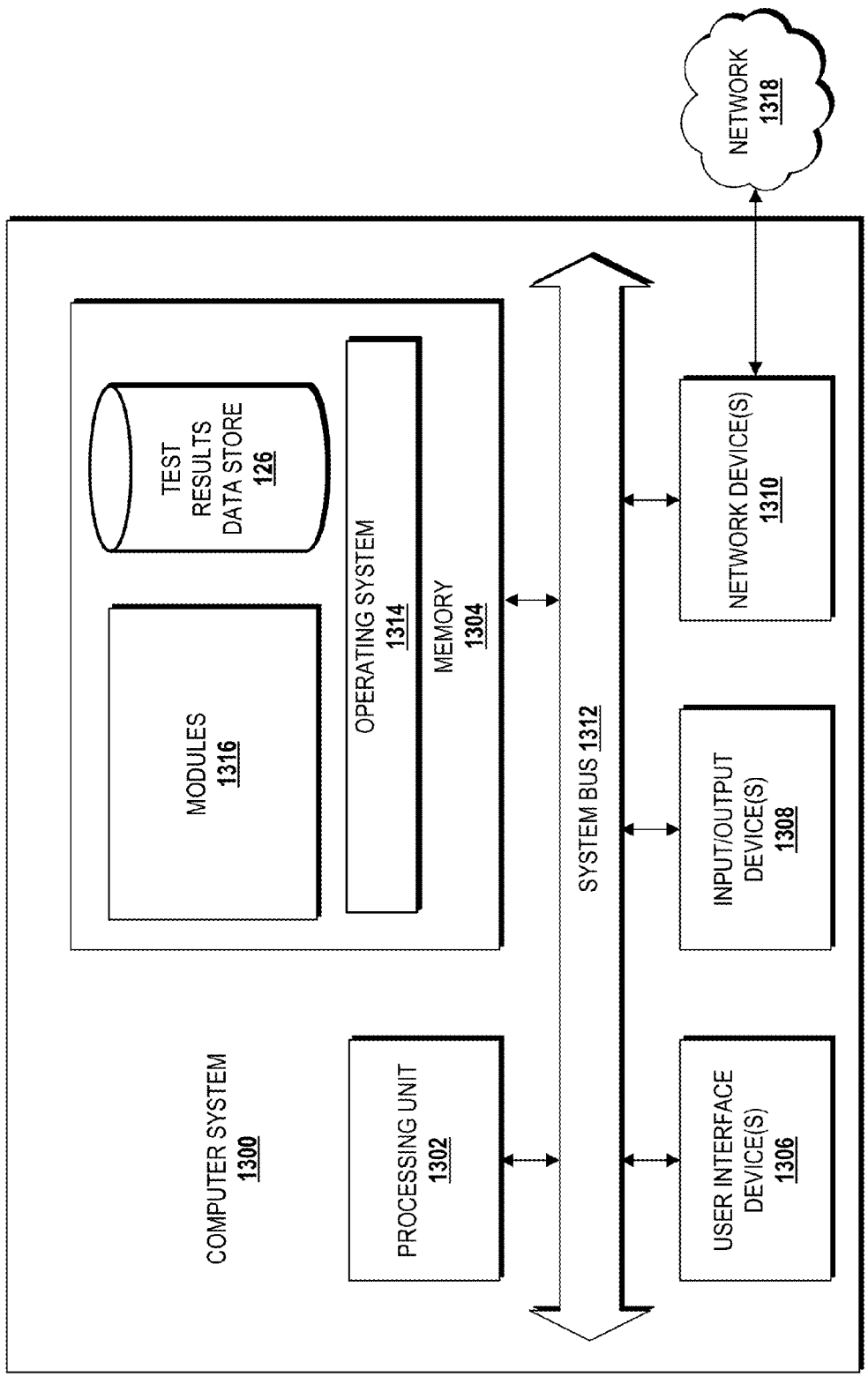
FIG. 13 is a computer architecture diagram illustrating an illustrative computer hardware and software architecture for a computing system capable of implementing aspects of the embodiments presented herein.

FIG. 13 is a block diagram illustrating a computer system 1300 configured to perform various operations disclosed herein. The remote testing and control system 104 may be configured like the computer system 1300.

The computer system 1300 includes a processing unit 1302, a memory 1304, one or more user interface devices 1306, one or more input/output ("I/O") devices 1308, and one or more network devices 1310, each of which is operatively connected to a system bus 1312. The bus 1312 enables bi-directional communication between the processing unit 1302, the memory 1304, the user interface devices 1306, the I/O devices 1308, and the network devices 1310.

The processing unit 1302 may be a standard central processor that performs arithmetic and logical operations, a more specific purpose programmable logic controller ("PLC"), a programmable gate array, or other type of processor known to those skilled in the art and suitable for controlling the operation of the computer system 1300. Processing units are generally known, and therefore are not described in further detail herein.

The memory 1304 communicates with the processing unit 1302 via the system bus 1312. In some embodiments, the memory 1304 is operatively connected to a memory controller (not shown) that enables communication with the processing unit 1302 via the system bus 1312. The illustrated memory 1304 includes an operating system 1314, modules 1316, and the test results data store 126. The modules 1316 include the data analysis module 110, the user interface module 112, the test schedule module 114, the pending test module 116, the test result search module 118, the test results archive module 120, the real-time test results module 122, and scheduled test results module 124, each of which is described in greater detail herein above.

The operating system 1314 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 1306 may include one or more devices with which a user accesses the computer system 1300. The user interface devices 1306 may include, but are not limited to, computers, servers, personal digital assistants, telephones (e.g., cellular, IP, or landline), or any suitable computing devices. The I/O devices 1308 enable a user to interface with the program modules. In one embodiment, the I/O devices 1308 are operatively connected to an I/O controller (not shown) that enables communication with the processing unit 1302 via the system bus 1312. The I/O devices 1308 may include one or more input devices, such as, but not limited to, a keyboard, a mouse, or an electronic stylus. Further, the I/O devices 1308 may include one or more output devices, such as, but not limited to, a display screen or a printer.

The network devices 1310 enable the computer system 1300 to communicate with other networks or remote systems via a network 1318, such the wireless communications network 106 described herein above. Examples of the network devices 1310 include, but are not limited to, a modem, a radio frequency ("RF") or infrared ("IR") transceiver, a telephonic interface, a bridge, a router, or a network card. The network 1318 may include a wireless network such as, but not limited to, a WLAN such as a WI-FI network, a WWAN, a wireless personal area network ("WPAN") such as BLUETOOTH, or a wireless metropolitan area network ("WMAN"). Alternatively, the network 1322 may be a wired network such as, but not limited to, a WAN) such as the Internet, a LAN such as the Ethernet, a wired personal area network ("PAN"), or a wired metropolitan area network ("MAN").

The network 1318 embodied as a cellular network may utilize a mobile telecommunications technology such as, but not limited to, GSM, UMTS, CDMA ONE, CDMA2000, LTE, and various other 2G, 2.5G, 3G, 4G, and greater generation mobile telecommunications technologies. In addition, mobile data communications technologies such as GPRS, EDGE, the HSPA protocol family including HSDPA, EUL or otherwise termed HSUPA, HSPA+, and various other current and future mobile data communications technologies are contemplated for use by the network 1318. Therefore, the embodiments presented herein should not be construed as being limited to a particular mobile telecommunications technology and/or standards utilizing such technologies.

As used herein, communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the MD 800. For purposes of the claims, the phrase "computer storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that technologies for remote control of mobile devices to perform testing of wireless communications networks have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A method for testing a wireless communications network remotely via a mobile device, the method comprising:
   sending, via a remote testing and control system, instructions to perform a test to the mobile device, the instructions to perform the test comprising instructions for the mobile device to attach to the wireless communications network over which to perform the test and to attach to a further wireless communications network over which to send test results of the test performed by the mobile device to the remote testing and control system;
   receiving, via the remote testing and control system, over the further wireless communications network, the test results of the test performed by the mobile device in response to the instructions to perform the test;
   presenting, via the remote testing and control system, the test results within a user interface; and
   receiving, via the user interface, an input to control the test results.

2. The method of claim 1, wherein:
   receiving the test results of the test performed by the mobile device in response to the instructions comprises receiving, in real-time, the test results of the test performed by the mobile device in response to the instructions; and presenting the test results within the user interface comprises presenting the test results as the test results are received by the remote testing and control.

3. The method of claim 2, wherein receiving the input to control the test results comprises receiving a request to stop the test via the user interface, and the method further comprises, in response to receiving the request to stop the test via the user interface:

sending instructions to stop the test to the mobile device; and no longer receiving the test results of the test performed by the mobile device.

4. The method of claim 3, further comprising:

receiving, via the user interface of the remote testing and control system, a request to initiate a new test;

in response to receiving the request to initiate the new test, sending, via the remote testing and control system, instructions to perform the new test to the mobile device;

receiving, via the remote testing and control system, new test results of the new test performed by the mobile device in response to the instructions to perform the new test; and presenting, via the remote testing and control system, the new test results within the user interface.

5. The method of claim 4, wherein:

receiving the new test results of the new test performed by the mobile device in response to the instructions to perform the new test comprises receiving, in real-time, the new test results of the new test performed by the mobile device; and presenting the new test results within the user interface comprises presenting the new test results as the new test results are received by the remote testing and control system.

6. The method of claim 4, wherein the test comprises a first set of parameters and the new test comprises a second set of parameters, the second set of parameters comprising a parameter that is different from the parameters comprised within the first set of parameters.

7. The method of claim 2, wherein receiving the input to control the test results comprises receiving a request to pause the test via the user interface, and the method further comprises, in response to receiving the request to pause the test via the user interface:

sending instructions to pause the test to the mobile device;
no longer receiving the test results of the test performed by the mobile device while the test is paused;
receiving a further input to control the test results, the further input comprising a request to resume the test; and
in response to receiving the request to resume the test via the user interface,
sending instructions to resume the test to the mobile device, and
resuming receiving the test results of the test performed by the mobile device.

8. The method of claim 2, further comprising archiving the test results in a test results data store.

9. The method of claim 1, wherein the wireless communications network comprises a mobile telecommunications network or a WI-FI network.

10. The method of claim 1, wherein the comprises a mobile telecommunications network or a WI-FI network.

11. A computer-readable storage medium having computer-executable instructions stored thereupon that, when executed by a computer, cause the computer to perform operations comprising:

sending instructions to perform a test to a mobile device;
receiving test results of the test performed by the mobile device in response to the instructions to perform the test;
receiving, via a user interface, an input to control the test results, the input to control the test results comprising a request to stop, pause, fast forward, rewind, or play the test results;
presenting a selection option within the user interface, the selection option comprising a plurality of test parameters of the test;
receiving, via the selection option within the user interface, selection of a test parameter from the plurality of test parameters of the test; and
presenting, within the user interface, the test results associated with the parameter.

12. The computer-readable storage medium of claim 11, wherein the operations further comprise:

receiving, via the selection option within the user interface, selection of a further test parameter of the plurality of test parameters of the test; and
presenting, within the user interface, the test results associated with the further parameter.

13. The computer-readable storage medium of claim 12, wherein the operations further comprise scheduling a time at which to send the instructions to perform the test to the mobile device; wherein sending the instructions to perform the test to the mobile device comprises sending the instructions to perform the test to the mobile device at the time; the operations further comprise causing the test results to be stored as scheduled test results; and wherein presenting, within the user interface, the test results associated with the parameter comprise presenting the scheduled test results within the user interface upon receipt of a request via the user interface to view the scheduled test results.

14. The computer-readable storage medium of claim 12, wherein the operations further comprise receiving a request to send the instructions to perform the test to the mobile device; wherein sending the instructions to perform the test to the mobile device comprises sending the instructions to perform the test to the mobile device in response to receiving the request; and wherein presenting, within the user interface, the test results associated with the parameter comprises presenting, in real-time, the test results associated with the parameter.

15. A remote testing and control system comprising:

a processor; and
a memory having processor-executable instructions stored thereupon that, when executed by the processor, cause the processor to perform operations comprising
sending instructions to perform a test to a mobile device,
receiving, in real-time, test results of the test performed by the mobile device in response to the instructions to perform the test,
causing the test results to be presented within a user interface as the test results are received, and
receiving, via the user interface, an input to control the test results, the input to control the test results comprising a request to stop the test or a request to pause the test;
if the input to control the test results comprises the request to stop the test, sending instructions to stop the test to the mobile device, thereby causing the mobile device to stop the test and to send no further test results to the remote testing and control system; and if the input to control the test results comprises the request to pause the test, sending instructions to pause the test to the mobile device, thereby causing the mobile device to pause the test and to send no further test results to the remote testing and control system while the test is abused.

16. The remote testing and control system of claim 15, wherein the user interface comprises one of the following:
a user interface presented on a display of the mobile device;
a user interface presented on a display of another mobile device;
a user interface presented on a display that is communicatively coupled to the remote testing and control system; and
a user interface presented within a web page.

17. The remote testing and control system of claim 15, wherein the operations further comprise
receiving, via the user interface, a request to initiate a new test, the new test comprising a test parameter that is different from a plurality of test parameters of the test;
in response to receiving the request to initiate the new test, sending instructions to perform the new test to the mobile device;
receiving, in real-time, new test results of the new test performed by the mobile device in response to the instructions to perform the new test; and
causing the new test results to be presented within the user interface.

18. The remote testing and control system of claim 15, wherein the operations further comprise
receiving a further input to control the test results, the further input comprising a request to resume the test from being paused; and
in response to receiving the request to resume the test via the user interface,
sending instructions to resume the test to the mobile device, and
resuming receipt the test results of the test performed by the mobile device.

19. The remote testing and control system of claim 15, wherein the instructions to perform the test are generated in response to a request to initiate the test at a present time or at a future time, and the request having been received by the remote testing control system from one of the following:
the mobile device;
another mobile device;
a web page designed in part to provide input to the remote testing and control system; and
an input device communicatively coupled to the remote testing and control system.

* * * * *